United States Patent [19]

Kadowaki et al.

[11] Patent Number: 5,216,478
[45] Date of Patent: Jun. 1, 1993

[54] DOPPLER VELOCITY METER

[75] Inventors: Hidejiro Kadowaki, Yokohama; Ken Tsuchii, Tokyo; Makoto Takamiya, Kawasaki; Kosuke Yamamoto, Yokohama; Masafumi Wataya, Kawasaki; Toshiyuki Yanaka, Tokyo; Haruhiko Takahashi; Hiroshi Sugiyama, both of Yokohama; Yasuhiko Ishida, Tokyo, all of Japan

[73] Assignee: Canon Kabushiki Kaisha, Tokyo, Japan

[21] Appl. No.: 839,708

[22] Filed: Feb. 24, 1992

Related U.S. Application Data

[63] Continuation of Ser. No. 501,499, Mar. 30, 1990, abandoned.

[30] Foreign Application Priority Data

| Mar. 31, 1989 | [JP] | Japan | 1-83208 |
| Feb. 2, 1990 | [JP] | Japan | 2-23786 |
| Feb. 16, 1990 | [JP] | Japan | 2-30644 |
| Feb. 16, 1990 | [JP] | Japan | 2-35274 |
| Feb. 16, 1990 | [JP] | Japan | 2-35275 |

[51] Int. Cl.⁵ ............................................. G01P 3/36
[52] U.S. Cl. .................................. 356/28.5; 356/356
[58] Field of Search ............................ 356/28.5, 356

[56] References Cited

U.S. PATENT DOCUMENTS

| 3,450,888 | 6/1969 | Spangler | 250/548 |
| 3,721,809 | 3/1973 | Strandberg et al. | 250/548 |
| 3,756,723 | 9/1973 | Hock | 356/110 |
| 4,470,696 | 9/1984 | Ballard | 356/28.5 |
| 4,595,287 | 6/1986 | Edlin | 356/28.5 |
| 4,696,568 | 9/1987 | Weistra | 356/28.5 |
| 4,948,257 | 8/1990 | Kaufman et al. | 356/28.5 |

FOREIGN PATENT DOCUMENTS

| 0127244 | 12/1984 | European Pat. Off. |
| 0226878 | 7/1987 | European Pat. Off. |
| 0302444 | 2/1989 | European Pat. Off. |

OTHER PUBLICATIONS

C. A. Greated et al.; Electro-Optics/Laser Int'l '76 UK, Brighton, Sussex, England; 9-11 Mar. '76; pp. 153-156; 356-28.5.

J. Oldemgarm et al.; J. of Physics E: Scientific Instr, 1975, vol. 8; pp. 203; 356-28.5.

Tedjojuwono et al., Appl. Opt., vol. 23, #15, Aug. 1984, p. 2554.

Mazumder, Appl. Phy. Let., vol. 16, #11, Jun. 1970, p. 462.

Stevenson, Appl. Opt., vol. 9, #3, Mar. 1970, p. 649.

"Doppler Velocimeter Using Diffraction Grating and White Light" by C. P. Wang; Applied Optics, vol. 13; (1974) May, No. 5; pp. 1193-1195.

"Two-dimensional Bragg cell LDV system using multiple light frequencies" by W. Michael Farmer; Applied Optics, vol. 17; (1978) Jan., No. 2 pp. 166-168.

"Optica Acta"; International Journal of Optics by Taylor & Francis Ltd vol. 9; (1962) Jan., No. 1; pp. 1-12.

"Leaser-und Avalanche-dioden fur die Geshwindigkeitsmessung mit Laser-Doppler-Anemometrie" by D. Dopheide et al., Technisches Messen tm, 54 (1987) Nos. 7-8; Munich, Germay pp. 291-303.

Primary Examiner—Stephen C. Buczinski
Attorney, Agent, or Firm—Fitzpatrick, Cella, Harper & Scinto

[57] ABSTRACT

A Doppler velocity meter has a radiation source for emitting a radiation beam the wavelength of which fluctuates, such as a laser; an optical system for directing the radiation beam to an object at an incident angle $\theta$ and a detector for detecting scattered beam generated from the object by directing the radiation beam. The optical system has a diffraction grating which serves to change the incident angle $\theta$ in accordance with a change in the wavelength $\lambda$ of the radiation beam in such a manner as to maintain the value of $\sin \theta / \lambda$ substantially constant. The velocity meter can accurately detect the velocity of movement of the object regardless of any change in the wavelength $\lambda$, because the diffraction grating serves to substantially compensate for any change in the frequency of the scattered beam caused by the change in the wavelength.

21 Claims, 18 Drawing Sheets

CASE-TEMPERATURE-DEPENDENCY OF EMISSION WAVELENGTH

FIG. 5
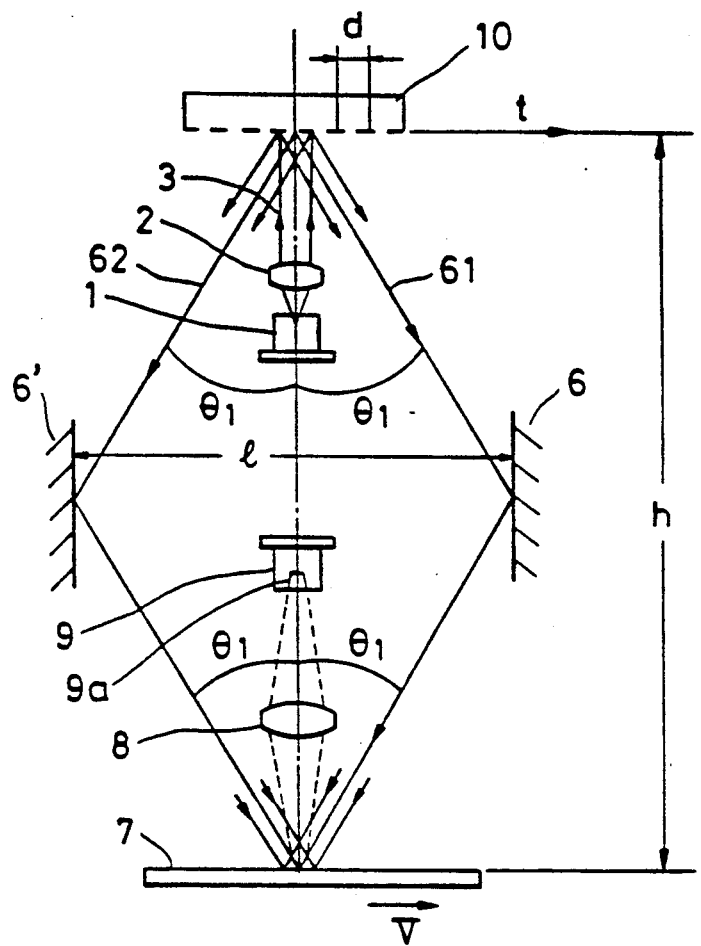
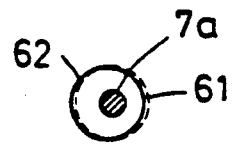
FIG. 6 (A)
FIG. 6 (B)
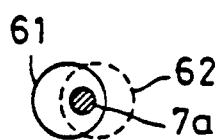
FIG. 6 (C)

$\lambda = 0.78 \mu m$
$\alpha = 2.0 \mu m$

DOPPLER VELOCITY METER

This application is a continuation of application Ser. No. 07/501,499 filed Mar. 30, 1990 now abandoned.

BACKGROUND OF THE INVENTION

1. Field of the Invention

The present invention relates to a velocity meter capable of measuring velocity of a moving object or a flowing fluid in a non-contact manner. More particularly, the present invention is concerned with a Doppler velocity meter which applies a laser beam to a moving object or fluid and measures the velocity by sensing a shift in the frequency of the laser beam.

2. Description of the Related Art

Hitherto, a laser Doppler velocity meter has been known and used which is capable of measuring the moving velocity of an object or a fluid in a non-contact manner and with a high degree of precision. Briefly, a laser Doppler velocity meter is a device which measures the velocity of a moving object or a flowing fluid by making use of a phenomenon called Doppler effect, i.e., a phenomenon in which the frequency of a laser beam scattered by the object or fluid is shifted from the frequency of the laser beam applied to the object or the fluid in an amount which is proportional to the velocity of the moving object or the fluid.

Referring to FIG. 1, a known laser Doppler velocity meter has, as its major components, a laser 1, a collimator lens 2, a parallel light beam 3, a beam splitter 4, reflective mirrors 6, 6', a condenser lens 8 and a photodetector 9. Numeral 7 denotes an object or a fluid moving at a velocity V in the direction of an arrow.

A laser beam emitted from a laser 1 is changed by a collimator lens 2 into a collimated light beam 3 which is then split into two light beams 5 and 5' by a beam splitter 4. These light beams 5, 5' are reflected by the reflective mirrors 5, 5' and are applied to the object or fluid 7 moving at the velocity V at an incident angle represented by $\theta$. The lights reflected and scattered by the object or the fluid 7 are detected by the photo-detector 9 through the condenser lens 8. The frequencies of the scattered lights are respectively Doppler-shifted in amounts of $+\Delta f$ and $-\Delta f$ which are proportional to the moving velocity V. Representing the wavelength of the laser beam by $\lambda$, the amount $\Delta f$ of frequency shift is expressed by the following formula (1).

$$\Delta f = V \sin \theta / \lambda \quad (1)$$

The scattered lights the frequencies of which have been shifted in amounts of $+\Delta f$ and $-\Delta f$, respectively, interfere with each other so as to cause a periodic change of brightness on the light-receiving surface of the photo-detector 9. The frequency F of the above-mentioned periodic change in the brightness is given by the following formula (2).

$$F = 2\Delta f = 2V \sin \theta / \lambda \quad (2)$$

It is therefore possible to determine the velocity of he moving object or the flowing fluid 7 in accordance with formula (2) above, by measuring the frequency output from the photo-detector 9.

In order to obtain a compact laser Doppler velocity meter, it is preferred to use a semiconductor laser such as a laser diode rather than a gas laser such as He-Ne laser as the light source. In general, however, the emission wavelength of semiconductor laser is not so stable as that of a gas laser, and undesirably changes depending on temperature. Since the Doppler frequency F depends on the wavelength $\lambda$ of the laser beam as will be seen from formula (2) above, the precision of detection of the moving velocity of the object or fluid is undesirably impaired by a fluctuation in the wavelength $\lambda$ of the laser beam.

FIG. 2 is a graph showing temperature-dependency of emission wavelength of a commercially-available laser diode, extracted from the Mitsubishi Semiconductor Data Book, 1987, Edition for Photo-semiconductor Devices). In this Figure, linear portions of the curve are caused mainly change in the refractive index of the active layer of the laser diode due to a change in temperature. The rate of change in the wavelength is about 0.05 to 0.06 nm/°C. On the other hand, non-linear change in the emission wavelength is attributed to a phenomenon known as "longitudinal mode hopping", in which the wavelength varies at a large rate of 0.2 to 0.3 nm/°C.

Thus, the emission wavelength of the laser diode is quite unstable. When this type of laser is used as the light source of a laser Doppler velocity meter, it is necessary to mount, together with the laser diode, a temperature control unit which is composed of, for example, a heater, a heat radiator and a temperature sensor. The use of such a temperature control unit undesirably increases the size of the velocity meter and raises the cost uneconomically.

It is also to be noted that the longitudinal mode hopping is caused also by a reason other than a temperature change. It is impossible to completely suppress a fluctuation in the emission wavelength of a laser diode even when a temperature control unit is used together with the laser diode.

SUMMARY OF THE INVENTION

Accordingly, an object of the present invention is to provide a Doppler velocity meter which is capable of precisely detecting the velocity of a moving object or a fluid regardless of any change in the wavelength of the emitted beam, thereby overcoming the above-described problems of the prior art.

According to a first aspect of the present invention, there is provided a Doppler velocity meter comprising: beam application means for applying an emitted beam to an object, and detecting means for detecting the scattered beam scattered by the object and capable of producing a signal corresponding to the frequency of the scattered beam; wherein the beam application means is capable of changing the angle of incidence of the emitted beam to the object in such a manner as to substantially compensate for a change in the frequency of the emitted beam caused by a change in the wavelength of the emitted wavelength.

According to a second aspect of the invention, there is provided a Doppler velocity meter comprising: an emission source capable of emitting a beam the wavelength of which is substantially variable; directing means for directing the beam emitted from the emission source towards an object; and detecting means capable of scattered beam scattered by the object and producing a signal of a frequency corresponding to the frequency of the scattered beam; wherein the directing means is capable of directing the emitted beam to the object in such a manner as to substantially suppress a change in the frequency attributable to a change in the wavelength of the emitted beam.

According to a third aspect of the invention, there is provided a laser Doppler velocity meter comprising: a laser; an optical system capable of applying a laser beam emitted from the laser to an object at an incident angle $\theta$, and detecting means capable of scattered beam scattered by the object and producing a signal of a frequency corresponding to the frequency of the scattered beam; the optical system being capable of changing the incident angle $\theta$ in accordance with the wavelength $\lambda$ of the laser beam so as to maintain the value of $\sin \theta/\lambda$ substantially constant.

According to a fourth aspect of the present invention, there is provided a laser Doppler velocity meter comprising: a laser; a diffraction grating for diffracting and deflecting a laser beam from said laser and generating first and second diffracted beams; an optical system for directing the first and the second diffracted beams to an object in such a manner as to make these diffracted beams cross on the object at an angle which is equal to the angle formed between these diffracted beams emitted from the diffraction grating; and a detector capable of detecting an interference beam formed as a result of an interference between a first scattered light and a second scattered light which are formed on the object by the first diffracted beam and the second diffracted beam, respectively, and capable of converting the interference beam into a signal.

The velocity meter of the invention can make use of a laser and a laser beam as the emission source and the emitted beam, as in the third and the fourth aspects of the invention. In such a case, in order to realize a compact velocity meter, a semiconductor laser is preferably used as the laser. The invention, however, can be carried out with other stable or unstable emission sources and beams.

In a preferred form of the present invention, the velocity meter is constructed such that the emitted beam is constantly aimed at a predetermined location regardless of any change in the wavelength of the beam. For instance, in the fourth form of the present invention, the optical system is arranged such that the position at which first and second diffracted beams cross each other is substantially unchanged. This arrangement makes it possible to maintain the measuring sensitivity substantially constant, thus enabling a stable measurement of the velocity. Such an optical system can be obtained by arranging the diffraction grating and the object substantially in an optically conjugate relation to each other, by utilizing lens assemblies in the optical system, incorporating a plurality of diffraction gratings in parallel or by suitably disposing various optical components such as mirrors.

In a preferred form of the present invention, the emitted beam is applied to the object substantially in the form of a collimated beam. Such an application of the beam can be effected not only by directing a previously collimated beam to the object but also by condensing the beam onto the object or its vicinity so as to irradiate the object with a beam which approximates a collimated beam.

In another preferred form of the invention, as in the fourth aspect mentioned before, the emitted beam is diffracted by a diffraction grating and at least one of the diffracted beams is directed to the object. Various types of grating are usable such as amplitude-type diffraction gratings and phase-type diffraction gratings. Diffraction gratings of relief type, which are easy to mass-produce, can be used effectively in the invention. Such diffraction gratings may be of the type which diffracts the incident beam while transmitting the same or of the type which diffracts the incident beam while reflecting the same.

In the velocity meter of the present invention, the diffraction grating is used for the purpose of changing the incident angle of the emitted beam to the object in accordance with a change in the wavelength of the emitted beam. It is possible to modulate the frequency of the signal from the detector by adding a mechanism which is capable of moving the diffraction grating at a constant velocity in the direction of arrangement of the diffraction grating. Such a modulation enables discrimination of the direction of movement of the object, as well as precise detection of the velocity of the object which is moving at low velocity.

The detecting means used in the velocity meter of the present invention may be arranged to detect either the light transmission-scattered by the object or reflection-scattered by the same. When the diffraction grating is of the type which reflects, diffracts and deflects the emitted beam, it is advisable that the detecting means is of the type capable of detecting the reflection-scattered light, so that the emission source, e.g., a semiconductor laser, and a detector, e.g., a photodetector, can be installed in the space between the diffraction grating and the object, thus contributing to a reduction in the size of the velocity meter.

It is also preferred that the detector is so arranged that its converter for converting the scattered beam into a signal is positioned substantially in an optically conjugate manner to the object. Such an arrangement enables the beam scattered by the object to be efficiently incident to the converter, thus attaining a high S/N ratio.

According to the present invention, it is thus possible to obtain a compact velocity meter by employing a semiconductor laser as an emission source. Such a compact velocity meter can conveniently be incorporated in an apparatus such as a facsimile, printer or the like, thus realizing an improved apparatus. This specification discloses some improved apparatus of the kind described. One of the most preferred examples of such apparatus is an image recording apparatus which comprises a conveyor means for conveying a recording medium such as a paper sheet, recording means for recording an image on the recording medium, and a velocity meter for detecting the velocity of the recording medium which is being conveyed by the conveyor means, wherein the velocity meter is capable of applying an emitted beam to a selected portion of the conveyor means, detecting a scattered beam generated at such a portion of the conveyor means, and outputting a signal which is indicative of the conveying velocity and which corresponds to the frequency of the scattered beam; wherein the angle of incidence of the emitted beam to the preselected portion of the conveyor means is varied in accordance with a change in the wavelength so as to substantially compensate for a change in the frequency caused by a change in the wavelength of the emitted beam.

The velocity meter of the present invention also can be mounted on various other types of apparatus. Although many types of velocity meter of the invention are described herein, it will be obvious to those skilled in the art to form various other velocity meters than those disclosed, within the scope of the present invention.

Other objects, features and advantages of the present invention will become clear from the following description of the preferred embodiments when the same is read in conjunction with the accompanying drawings.

BRIEF DESCRIPTION OF THE DRAWINGS

FIG. 5 is a schematic illustration of a first embodiment of the velocity meter of the present invention;

FIGS. 6(a) to 6(c) are illustrations of the relationship between the wavelength of a laser beam and two spots formed on an object;

DESCRIPTION OF THE PREFERRED EMBODIMENTS

Figure 3:
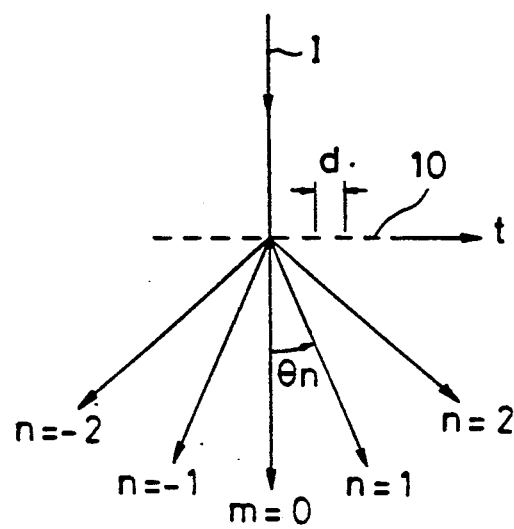
FIGS. 3 and 4 are illustrations explanatory of the principle of velocity detection performed by a velocity meter of the present invention.
Figure 4:
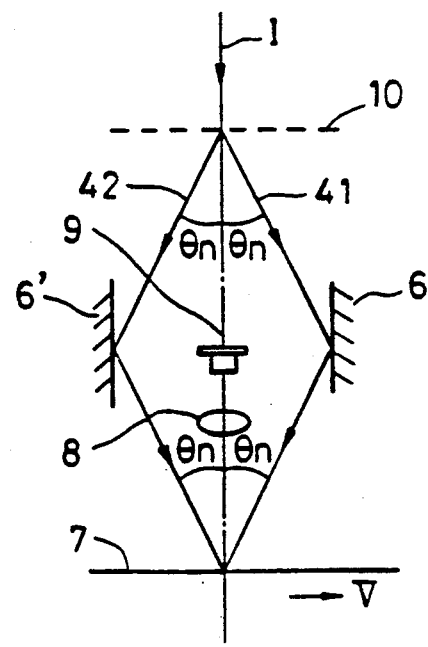

FIGS. 3 and 4 are illustrations of the principle of a velocity meter of the present invention.

FIG. 3 illustrates the state of diffraction of a laser beam I having a wavelength λ when the light beam is made incident to a transmission-type diffraction grating 10 of a pitch d, as observed when the laser beam I impinges in a direction perpendicular to the direction t of arrangement of the grating 10. The diffraction angles $\theta$ of diffracted lights of the respective orders generated by the diffraction grating 10 are expressed by the following formula.

$$\sin \theta = \pm m/\lambda d \qquad (3)$$

$(m = 0, 1, 2, \ldots)$

Therefore, the diffraction angles $\theta_n$ of the diffracted lights of $\pm n$ th orders other than the order 0 ($m=0$) are expressed by the following formula:

$$\sin \theta_n = \pm n/\lambda d \qquad (4)$$

$(n = 1, 2, \ldots)$

As will be clear from the formula (4), the diffraction angle $\theta_n$ of the diffracted lights of $\pm n$ th orders depend on the wavelength λ of the incident laser beam I so that the angles at which the diffracted lights of $\pm n$ th orders are emitted from the diffraction grating vary according to a change in the wavelength λ.

FIG. 4 illustrates a laser Doppler velocity meter having the diffraction grating of FIG. 3 incorporated in the optical system thereof. The arrangement shown in FIG. 4 is materially the same as that of the known device shown in FIG. 1 except that the diffraction grating 10 is provided. Therefore, the same reference numerals are used in FIG. 4 to denote the same components as those in FIG. 1 and detailed description of such components is omitted.

In the optical system shown in FIG. 4, the diffracted lights 41, 42 of the $\pm n$ th orders emitted from the diffraction grating 10 are reflected by parallel mirrors 6, 6' and are made to impinge upon substantially the same point on an object 7 at incident angle $\theta_n$ which is the same as the angles $\pm \theta_n$ of incidence. The reflective mirrors 6, 6' have reflecting surfaces disposed in planes which are perpendicular to the direction of arrangement of the diffraction grating 10 and the direction of movement of the object 7.

The Doppler frequency represented by the output signal from the photo-detector 9 in this state can be expressed by the following formula (5) derived from the aforementioned formulae (2) and (4).

$$F = 2V \sin \theta_n / \lambda = 2nV/d \qquad (5)$$

Thus, the Doppler frequency F does not depend on the wavelength λ of the laser beam but is in inverse proportion to the pitch d of the grating and in proportion both to the number n of the order of the diffracted light and the velocity V of movement of the object 7. Since the pitch d of the diffraction grating 10 is sufficiently stable, the Doppler frequency F depends solely on the velocity V of the object 7, regardless of the wavelength of the laser beam. Therefore, the photo-detector 9 produces an output exactly corresponding to the velocity V of the object 7 regardless of any change in the emission wavelength of the laser which is not shown.

Embodiments of the laser Doppler velocity meter of the present invention, relying upon the principle described above, will be described hereinunder. Although the following embodiments employ a reflection-type diffraction grating, it is to be noted that a transmission-type diffraction grating as shown in FIG. 4 can be used equally well.

FIG. 5 is a schematic illustration of a first embodiment. In this Figure, the same reference numerals are used to denote the same components as those used in the known device shown in FIG. 1, and detailed description of such parts is omitted.

In the first embodiment, a laser diode 1 capable of emitting a laser beam of a wavelength λ of 0.78 μm is used so as to realize a compact construction. The laser 1 may be a single-mode laser or a multi-mode laser. The diffraction grating 10 is a reflective diffraction grating having a grating pitch d of 1.6 μm. The diffraction grating 10 can be prepared by periodically forming reflective films of Al or Au on the surface of a substrate such as a glass substrate, or periodically forming grooves in the substrate surface and then forming a reflective film on the substrate surface. It is thus possible to use various types of diffraction grating such as amplitude-type or phase-type (relief type) as the diffraction grating 10.

The laser beam from the laser diode 10 is collimated by the collimator lens 2 into a beam 3 having a diameter of about 3 mm. This collimated light beam 3 is made to incident to the reflection-type diffracted grating 10 in a direction perpendicular to the direction to of disposal of the diffraction grating 10. The diffracted lights 61, 62 of the order of ±1 generated by the diffraction grating 10 are emitted from the diffraction grating 10 at diffraction angles $\theta_1$ of about 29° and are reflected by the mirrors 6, 6' having surfaces perpendicular to the direction t of disposal of the grating so as to obliquely impinge upon the object 7 at incident angle $\theta_1$, respectively. Thus, the diffracted lights 61, 62 form spots of about 2 mm diameter and these spots are superposed on the object 7. The photo-detector 9 has a light-receiving portion 9a having a diameter of 0.8 mm, and the central portions of 0.8 mm diameter of the light spots formed by the diffracted lights 61, 62 are projected in real size on the light-receiving portion 9a of the photo-detector 9. Thus, the light-receiving portion 9a of the photo-detector 9 effectively receives the interference light of two diffracted lights 61, 62 and converts the interference light into an electrical signal. The photo-detector 9 then produces a signal corresponding to the Doppler frequency F which is obtained as F=2V/d by substituting n=1 to the formula (5) and which is independent from the wavelength λ.

Representing the distance between the mirrors 6 and 6' by l, the distance h between the diffraction grating 10 and the object 7 at which two diffracted lights 61, 62 are completely superposed on each other is given by the following formula (6).

$$h = l\sqrt{d^2 - \lambda^2}/\lambda \qquad (6)$$

Therefore, when the distance l between the mirrors 6, 6' is 30 mm, the distance h between the diffraction grating 10 and the object 7 is calculated to be h=53.7 mm, since in this case the wavelength and the grating pitch are respectively given as λ=0.78 μm and d=1.6 μm, respectively. When the oscillation frequency of the laser diode 1 is changed by 1% (which generally corresponds to about 30° C. change in the temperature of the laser diode 1), the light spots formed by two diffracted lights are superposed in the manners shown in FIGS. 6(b) and 6(c), when the frequency is changed to long-wavelength side and to short-wavelength side, respectively. In each of the cases shown in FIGS. 6(b) and 6(c), both light spots are about 0.8 mm offset from each other. Since the photo-detector 9 detects the portion 7a where two spots overlap each other, the photo-detector 9 is capable of simultaneously detecting scattered lights generated from the diffracted lights 61, 62 and can produce a signal corresponding to the Doppler frequency F without fail. It will thus be clear that a fluctuation in the emission wavelength does not cause any substantial error.

Figure 7:
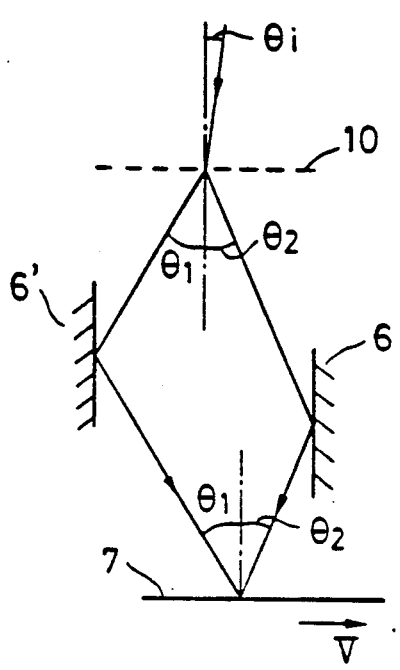
FIG. 7 is an illustration of angle of incidence of a laser beam to a diffraction grating and Doppler frequency.

In the described embodiment, the laser beam I is made to impinge upon the diffraction grating 10 in a direction perpendicular to the direction t of arrangement of the diffraction grating 10. The precision of detection of velocity, however, does not depend on the angle $\theta_i$ of incidence to the diffraction grating 10. In addition, the influence of a change in the wavelength of the laser beam I on the detection of velocity is small even when the diffraction grating 9 is inclined. FIG. 7 illustrates a state in which a laser beam I is made incident at an incident angle $\theta_i$ to the diffraction grating 10 which is arranged such that the direction of arrangement of the grating is perpendicular to the parallel reflective surfaces of the reflection mirrors 6, 6. The diffraction angle $\theta_1$ of the +1 order and the diffraction angle $\theta_2$ of the −1 order from the diffraction grating 10 satisfy the following formulae (6) when the arrangement is made to provide positive values of these angles $\theta_1$ and $\theta_2$.

$$\sin \theta_1 = \lambda/d + \sin \theta_i$$

$$\sin \theta_2 = \lambda/d - \sin \theta_i \qquad (6)$$

On the other hand, the Doppler frequency F, which is determined by the interference between lights scattered by the object 7 which is moving at a velocity V in the direction perpendicular to the reflective surfaces of the reflective mirror 6, 6' and which is at the position where two diffracted lights reflected by the mirrors 6, 6' cross each other, is given by the following formula.

$$F = \frac{2 V \cos\{(\theta_1 - \theta_2)/2\} \sin\{(\theta_1 + \theta_2)/2\}}{2} \qquad (7)$$

From the formulae (5) and (6), the Doppler frequency F is determined to be F=2V/d. It is therefore understood that the Doppler frequency is independent from the angle $\theta_i$ of incidence of the laser beam to the diffraction grating 10.

It is thus possible to direct the laser beam to the diffraction grating 10 at any desired angle $\theta_i$ to the diffraction grating 10, by disposing the diffraction grating 10 in parallel with the direction of movement of the object 7 while disposing the mirrors 6, 6' such that their reflective surfaces are perpendicular to the direction of movement of the object.

Figure 8:
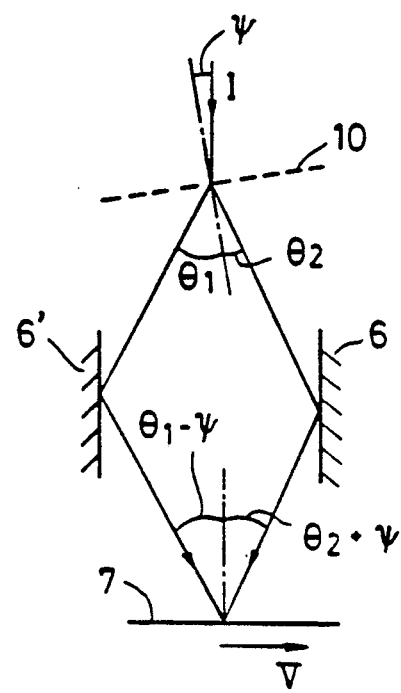
FIG. 8 is an illustration of the relationship between inclination of a diffraction grating and the Doppler frequency.
Figure 9:
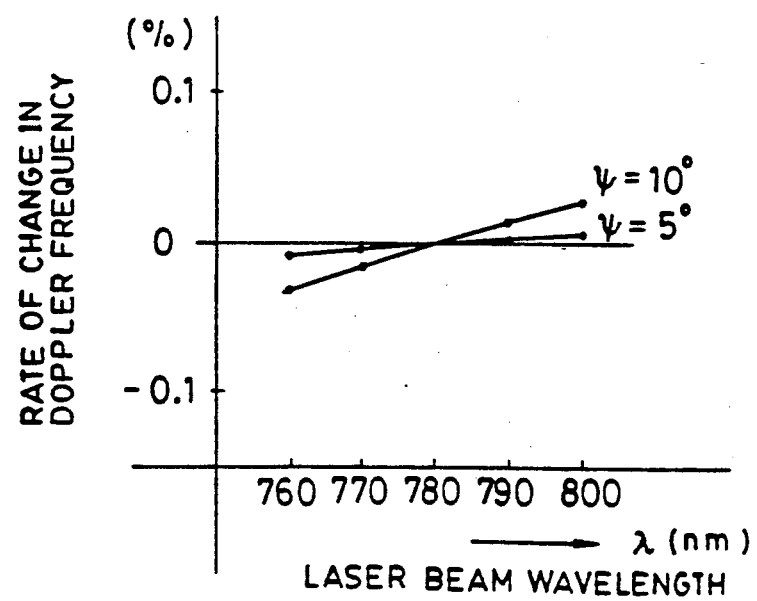
FIG. 9 is a graph showing the relationship between the wavelength of a laser beam and the Doppler frequency as obtained when the inclination of the diffraction grating is used as a parameter.

FIG. 8 shows an arrangement in which the mirrors 6, 6' having reflective surfaces perpendicular to the direction of movement of the object 7 are arranged in parallel with each other as in the arrangement shown in FIG. 7, wherein the path of the laser beam I is determined to be parallel to the reflective surfaces of the mirrors 6, 6' so that the line normal to the diffraction grating is inclined to the path of the laser beam I at an angle $\Psi°$. FIGS. 9 shows the relationships between the wavelength λ of the laser beam I and the Doppler frequency F as obtained when the angle $\Psi°$ is 5° and 10°, respectively.

As will be understood from FIG. 9, it is possible to suppress the influence of the wavelength on the Doppler frequency by maintaining the inclination angle $\Psi°$ of the diffraction grating to be $\Psi=5°$. Setting of the diffraction lattice 10 to satisfy this requirement can be conducted without difficulty. It is thus possible to constantly obtain a high precision of detection of the velocity.

In the arrangement shown in FIG. 5, it is possible to reduce the offset of two light spots on the object 7 due to fluctuation in the wavelength by setting a small distance l between the mirrors 6, 6'. According to this arrangement, the distance h between the diffraction grating 10 and the object 7 also can be made small, so that the velocity meter can be made compact and the production of velocity meter is facilitated.

According to the invention, the number of order of the refracted lights used for the detection is not limited to the first order. For instance, by using the diffraction lights of the second order in the velocity meter shown in FIG. 5, the Doppler frequency F is determined by the formula (4) as F=4 v/d, whereby the resolution is improved.

The invention can be effectively carried out not only with a semiconductor laser such as a laser diode but also with other types of laser which may exhibit fluctuation in the emission wavelength. The optical system arrangements shown in FIGS. 4 and 5 also are only illustrative and various other arrangements can be used, and some will be described later.

The described embodiment employs a pair of diffracted lights of ±n th orders generated by the diffraction grating. This, however, is not exclusive and the above-described advantages of the invention can be brought about also when only one diffracted light is used. When one diffracted light is used, the laser beam from the laser is split into two beams one of which is directed to a diffraction grating so as to be diffracted. The diffracted light is applied to and scattered by the object and the scattered light is made to interfere with a reference light which is the other light beam obtained by the beam splitting so that an interfered light is formed.

When the object is transparent, the velocity meter may be constructed such that the photo-detector receives the light which is transmission-scattered by the object.

All these modifications are within the scope of easy choice by those skilled in the art. The above and other embodiments are therefore only illustrative and are not intended to restrict the scope of the invention.

As has been described, according to the present invention, the optical system is so arranged that the angle θ of incidence of the laser beam to the moving object or fluid is varied in accordance with a change in the emission wavelength of the laser beam, so as to maintain the value of sin θ/λ substantially constant, so that the velocity of the moving object of fluid can be detected exactly.

It is thus possible to obtain a compact and inexpensive Doppler velocity meter incorporating a small semiconductor laser unit such as a laser diode.

Figure 10:
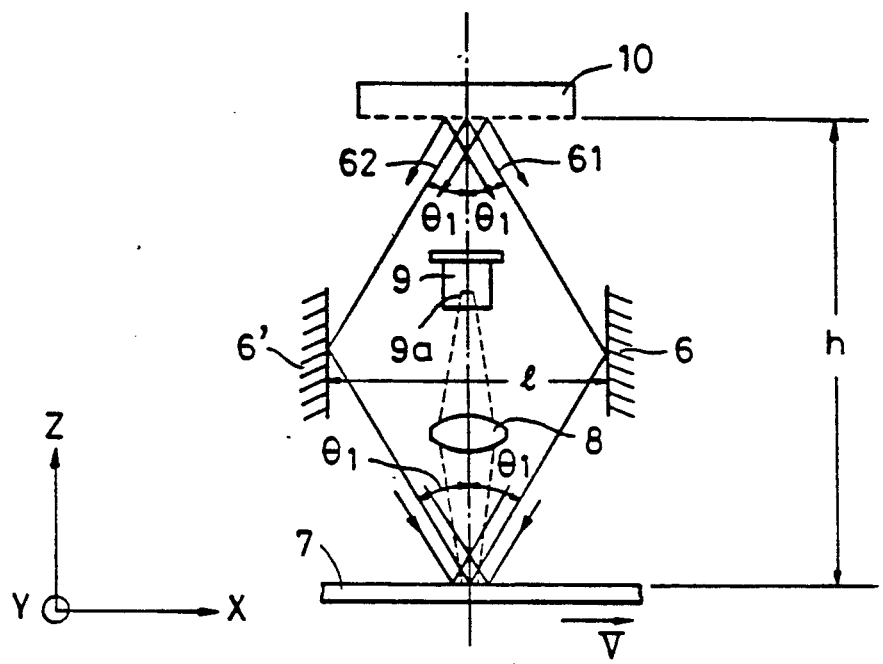
FIGS. 10A and 10B are schematic illustrations of a second embodiment of the velocity meter of the present invention.
Figure 10:
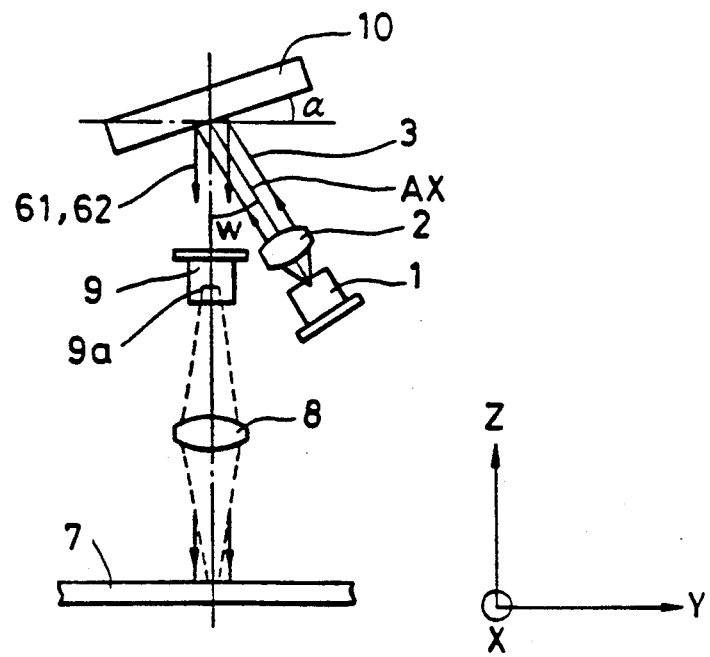

FIGS. 10A and 10B are a schematic front elevational view and a schematic side elevational view of a second embodiment of the present invention. In these Figures, the same reference numerals are used to denote the same components or elements as those shown in FIG. 5. As will be understood from a comparison between FIGS. 10A, 10B and FIG. 5, the basic construction of the second embodiment of the velocity meter is materially the same as that of the first embodiment shown in FIG. 5. The improvement of the second embodiment over the first embodiment resides in a change in the arrangement of the laser diode 1, collimator lens 2 and the reflection type diffraction grating 10. The laser diode 1 and the collimator lens 2 are omitted from FIG. 10A, while FIG. 10B omits illustration of the mirrors 6, 6'.

The characteristic feature of this embodiment is well understood from FIG. 10B which is a side elevational view. As will be seen from FIG. 10B, the laser diode 1 and the collimator lens 2 are disposed at positions which are spaced from the incidence plane (plane of the drawing sheet of FIG. 10A) which includes the light paths for the ± first-order diffracted lights 61, 62. In addition, the diffraction grating 10 is disposed within a plane (Z-Y plane) which are perpendicular both to the incident plane (Z-X plane) and the direction of movement of the object 7 (X-direction).

More specifically, in the described embodiment, the diffraction grating 10 is inclined such that the direction of the grating line (line corresponding to groove perpendicular to the direction t of grating arrangement) forms an angle α to the direction (y direction) which is perpendicular to the direction of movement of the object. In this embodiment, the angle α is set to be 15°.

On the other hand, the beam application system including the laser diode 1 and the collimator lens 2 is arranged such that the optical axis AX of this illuminating system forms an angle W to the axis (Z direction) perpendicular to the object. The angle W is formed in the same plane as the plane in which the diffraction grating 10 is inclined, i.e., in the Z-Y plane. In this case, the angle W is determined to be 28.06°.

Figure 11:
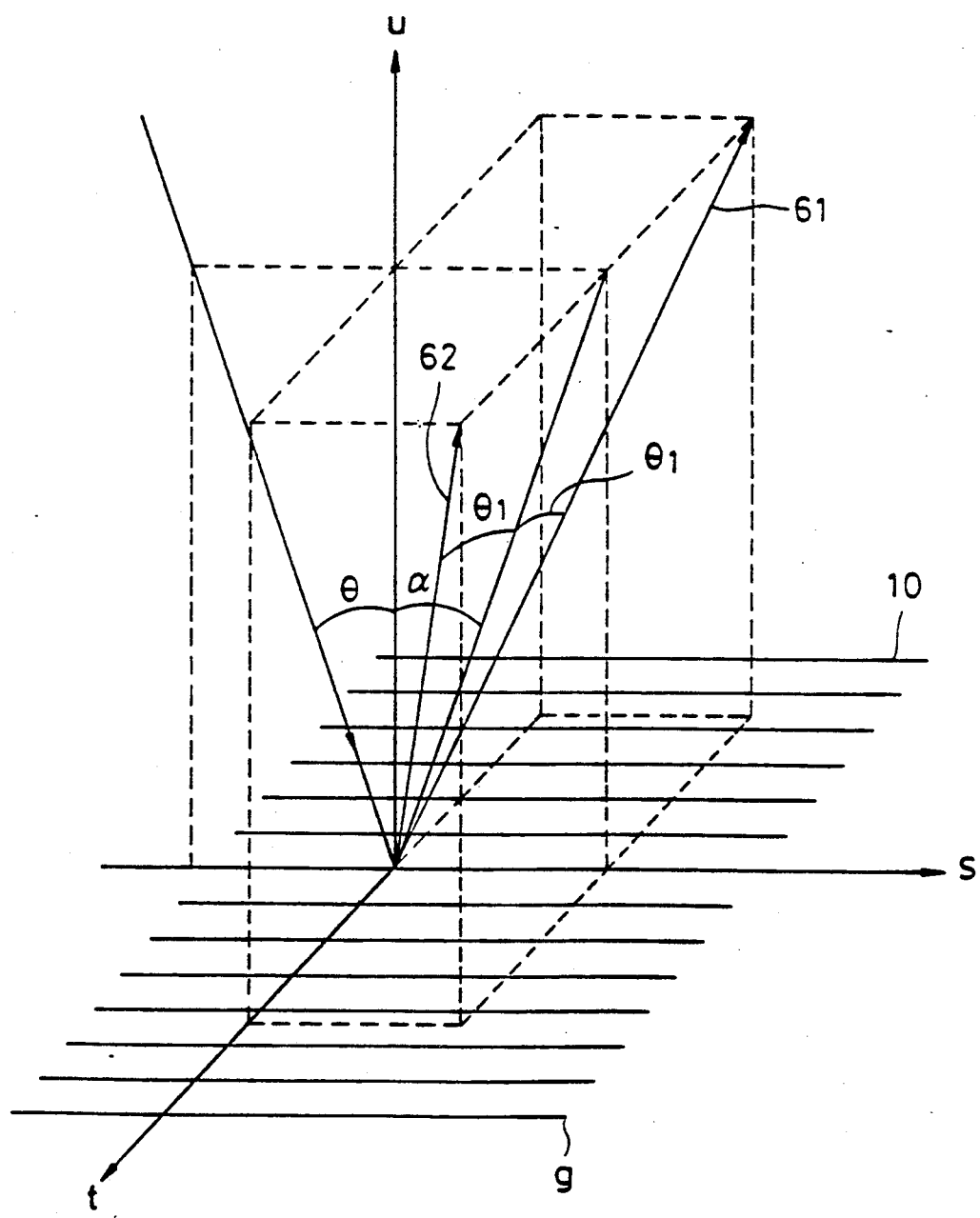
FIG. 11 is an illustration of the manner in which a laser beam is applied obliquely to a diffraction grating.

Referring now to FIG. 11, a grating plane (t-S plane) is defined by the direction t of arrangement of grating and the direction S in which the grating lines g extend. When a laser beam impinges upon the diffraction grating at an incident angle θ to the line u normal to the t-S plane, the angle formed between the plane including the light paths of the diffracted lights 61, 62 of the ± first-order is represented by $a$, while the bisector of the angle formed between the diffracted lights 61, 62 of the ± first-order is represented by $\theta_1$. Then, the following conditions are met:

$$d \sin \theta_1 = \lambda$$

(where d represents the pitch of the diffraction grating, while λ represents the wavelength) sin θ = cos $\theta_1$ sin α

In this embodiment, since the angles α and W are respectively 15° and 28.06°, while θ is expressed as θ=W−α, the diffraction angle $\theta_1$ of the diffracted lights 61, 62 of the ± first-order is expressed as $\theta_1$=29°. In addition, the incidence plane including the paths of the diffracted lights 61, 62 of the ± first-order is perpendicular to the object 7 and parallel to the Z-X plane. In this embodiment also, the refracted lights 61, 62 of the ± first-order are emitted from the diffraction grating at diffraction angle $\theta_1$ which is substantially equal to 29° and are reflected by the mirrors having reflective surfaces perpendicular to the direction X of movement of the object 7, so as to obliquely impinge upon the object 7 at incident angle $\theta_1$. The diffracted lights 61, 62 form light spots of about 2 mm diameter which overlap each other on the object 7. The photo-detector 9 has a light-receiving portion 9a of 0.8 mm diameter on which the central portion of the overlapping light spots in diameter of 0.8 mm is projected in real size through the condenser lens 8. Thus, the light-receiving portion 9a of the photo-detector 9 efficiently receives the interference light formed by the scattered lights obtained from the diffracted lights 61, 62, and photo-electrically coverts the interference light into electrical signal. The photo-detector 9 therefore produces a signal corresponding to the Doppler frequency F which is obtained as $F=2V/d$ by substituting $n=1$ to the formula (5) and which is independent from the wavelength $\lambda$.

In the velocity meter shown in FIG. 5, the distance h between the object 7 and the diffraction grating 10 is determined as $h=53.7$ mm. In contrast, in the velocity meter of the embodiment shown in FIGS. 10A and 10B in which the light applying system including the laser diode 1 and the collimator lens 2 disposed at a position outside the incident plane which includes the paths of the diffracted lights 61, 62 of the ± first order, the distance h between the object 7 and the diffraction grating 10 can be reduced to about 32 mm. A change in the oscillation frequency of the laser diode 1 by 1% causes about 0.5 mm deviation of each light spot. Thus, the offset of two light spots from each other is reduced as compared with the embodiment shown in FIG. 5.

It will be understood that the second embodiment of the velocity meter shown in FIGS. 10A and 10B can have a reduced size and yet be capable of measuring the velocity at a higher detection sensitivity than the embodiment shown in FIG. 5.

Figure 12:
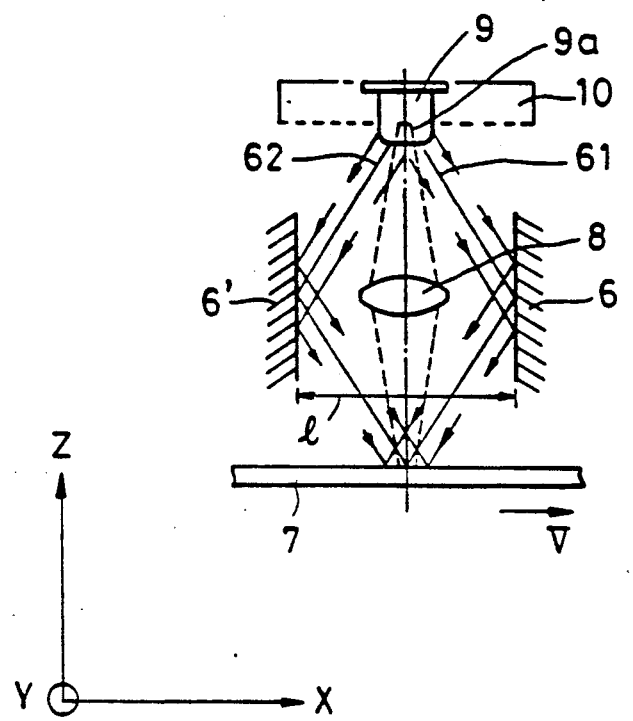
FIG. 12 is a schematic illustration of a third embodiment of the velocity meter in accordance with the present invention.
Figure 12:
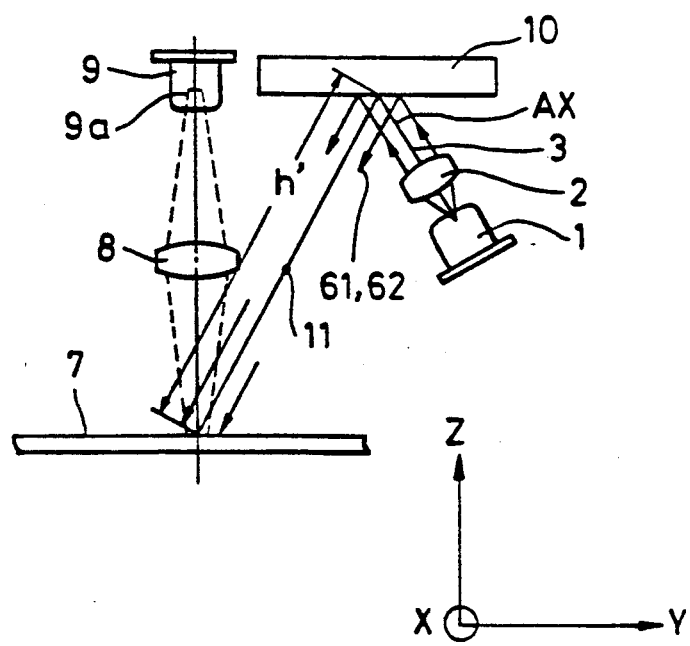

FIGS. 12A and 12B are a schematic front elevational view and a schematic side elevational view of a third embodiment of the present invention. In these Figures, the same reference numerals are used to denote the same components or elements as those shown in FIGS. 5, 11A and 11B. As will be realized from a comparison between FIG. 5 and FIGS. 12A, 12B, the third embodiment of the velocity meter of the invention has a basic arrangement which is substantially the same as that of the first embodiment shown in FIG. 5. The improvement of the third embodiment over the first embodiment resides in a specific arrangement of the laser diode 1, collimator lens 2 and the reflection-type diffraction grating 10. Another point of difference resides in that, while in the second embodiment shown in FIGS. 11A, 11B the diffraction grating 10 is installed obliquely at a position above the photo-detector 9, the diffraction grating 10 in the third embodiment is disposed adjacent to the photo-detector and in parallel with the surface of the object 7.

The laser diode 1 and the collimator lens 2 are omitted from FIG. 12A, while FIG. 12B lacks illustration of the mirrors 6, 6'. In FIG. 12B, numeral 11 denotes a point at which the diffracted light 61 or 62 is reflected by the mirror 6' or 6 which is not shown.

In this embodiment, the diffraction grating 10 is positioned substantially at the same level as the photo-detector 9. As explained before, the diffraction grating 10 is disposed substantially in parallel with the surface of the object 7 and the direction t of arrangement of the grating coincides with the direction X of movement of the object 7.

The optical axis AX of the light application system including the laser diode 1 and the collimator lens 2 is inclined to the grating lines of the diffraction grating 10 at a predetermined angle $\beta$ with respect to the X-Y plane. The laser light emitted from the laser diode 1 is collimated by the collimator lens 2 and obliquely impinges upon the fixed diffraction grating 10. Therefore, the directions of emission of the refracted lights 61, 62 of the ± first order from the diffraction grating form the above-mentioned angle $\beta$ to the grating lines of the diffracted grating 10 with respect to the Z-Y plane. The incident plane including the light paths of the diffracted lights 61, 62 of the ± first order is therefore inclined both to the diffraction grating 10 and the surface of the object 7. In this embodiment, as in the cases of the preceding embodiments, the grating pitch d of the grating 10 and the wavelength $\lambda$ are respectively determined as $d=1.6$ μm and $\lambda=0.78$ μm. The diffraction angles of the diffracted lights 61, 62 of the ± first order, therefore, are determined as $\theta_1=29°$.

The reflection-diffracted lights 61, 62 from the diffraction grating 10 are respectively reflected by the mirrors 6, 6' having reflective surfaces perpendicular to the direction t of arrangement of the grating, and obliquely impinge upon the object 7 at the angle $\theta_1$ to the Z-X plane and at the angle $\beta$ to the X-Y plane. The diffracted lights 61, 62 form light spots of several millimeters in diameter which overlap each other on the object 7. The photo-detector 9 has a light-receiving portion 9a of 0.8 mm diameter on which the central portion of the overlapping light spots in diameter of 0.8 mm is projected in real size through the condenser lens 8. Thus, the light-receiving portion 9a of the photo-detector 9 efficiently receives the interference light formed by the scattered lights obtained from the diffracted lights 61, 62, and photo-electrically coverts the interference light into electrical signal. The photo-detector 9 therefore produces a signal corresponding to the Doppler frequency F which is obtained as $F=2V/d$ by substituting $n=1$ to the formula (5) and which is independent from the wavelength $\lambda$.

In this embodiment, the light applying optical system including the laser diode 1 and the collimator lens 2 and the detection optical system including the condenser lens 8 and the photo-detector 9 are arranged at positions outside the incident plane containing the light paths of the diffracted lights 61, 62, so that a more compact design of the velocity meter is obtained over that shown in FIGS. 11A and 11B. For instance, in this embodiment of the velocity meter, the distance h' between the diffraction grating 10 and the object 7 along the incident plane containing the paths of the diffracted lights 61, 62 can be reduced to about 23 mm, while the spacing between the diffraction grating 10 and the object 7 can be made as small as 20 mm or les. Furthermore, in the velocity meter of this embodiment, the deviation of each of the light spots formed by the diffracted lights 61 and 62 caused by a 1% change in the oscillation frequency of the laser diode 1 can be made as small as 0.35 mm.

Figure 13:
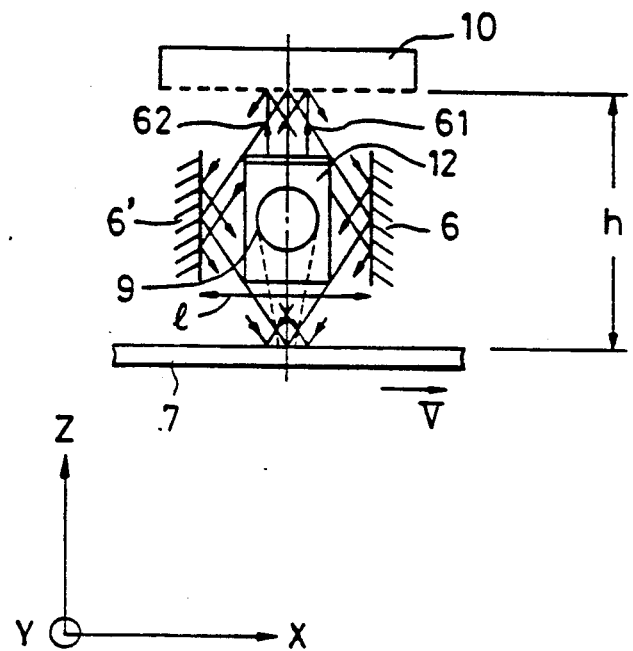
FIG. 13 is a schematic illustration of a fourth embodiment of the velocity meter in accordance with the present invention.
Figure 13:
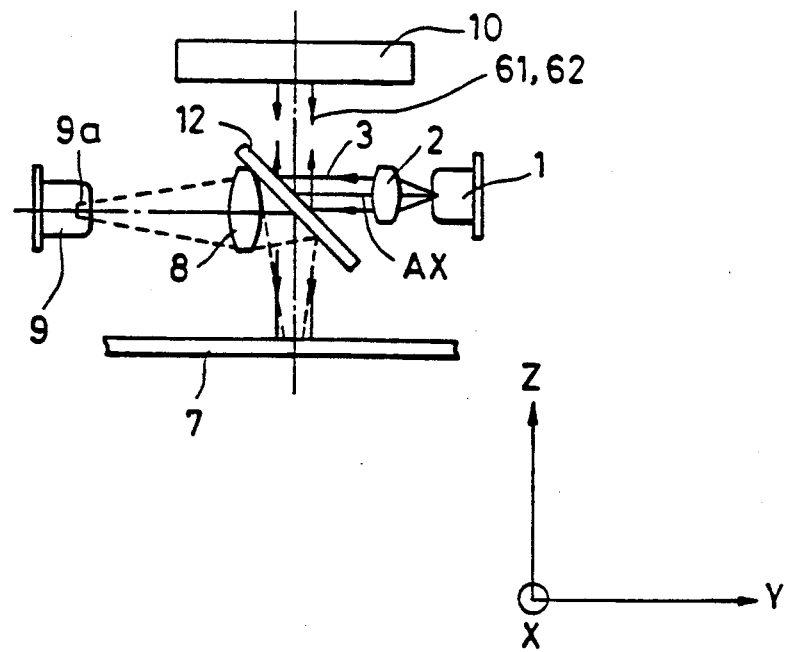

FIGS. 13A and 13B are a schematic front elevational view and a schematic side elevational view of a fourth embodiment of the present invention. In these Figures, the same reference numerals are used to denote the same components or elements as those shown in FIGS. 5, 10A, 10B, 12A and 12B. In FIGS. 13A and 13B, numeral 12 denotes a double-sided mirror.

This embodiment has a feature over the embodiment shown in FIG. 5 in that the laser diode 1, collimator lens 2, the condenser lens 8 and the photo-detector 9 are arranged in a plane which is parallel both to the surface of the object 7 and the diffraction grating 10, by virture of the use of the double-sided mirror 12.

In this embodiment, the direction t of the diffraction grating 10 and the direction X of movement of the object 7 coincide with each other and, as will be described later, the incident planes containing the light paths of the diffracted lights 61, 62 are perpendicular to the directions t and X and also to the surface of the object 7.

The double-sided mirror 12 is produced by, for example, forming reflective films of Al on both sides of a glass substrate. Alternatively, the double-sided mirror 12 may be made from a metallic plate. The double-sided mirror 12 is arranged between the object 7 and the diffraction grating 10 such that the reflective surfaces on both sides of the double-sided mirror 12 form 45° to the surface of the object surface 7. The light applying system including the laser diode 1 and the collimator lens 2 is arranged so as to direct the laser beam onto the upper reflective surface of the double-sided mirror 12, such that the optical axis AX of this system is parallel to the grating lines of the diffraction grating 10. The detection system including the condenser lens 8 and the photo-detector 9 is disposed so as to receive the light reflected by the lower reflective surface of the double-sided mirror 12, and is arranged such that the optical axis of this system is parallel to the optical axis AX of the light applying system. The optical axis AX of the light applying means is orthogonally deflected at the reflective surface of the double-sided mirror 12 and orthogonally crosses the diffraction grating 10. The optical axis of the detection system also is orthogonally deflected at the reflective surface of the double-sided mirror 12 and orthogonally crosses the surface of the object 7.

In operation, the laser beam from the laser diode 1 is collimated by the collimator lens 2 and the collimated beam impinges upon one of the reflective surfaces of th double-sided mirror 12. The laser beam reflected by the mirror 12 then vertically impinges upon the fixed diffraction grating 10 perpendicularly thereto, and is reflection-diffracted by the diffraction grating 10. Among the diffracted lights of many orders, the diffracted lights 61, 62 of the ± first orders are emitted from the diffraction grating 10 at the diffraction angle $\theta_1$ of about 29° and are directed to the mirrors 6, 6', respectively. The double-sided mirror 12 is sized and shaped so as not to interrupt the light paths 61, 62 of the ± first orders derived from the diffraction grating 10. The reflective surfaces of the mirrors 6, 6' are parallel to the plane which orthogonally crosses the direction X of movement of the object 7 and the direction t of arrangement of the grating of the difraction grating 10.

The diffracted lights 61, 62 are reflected by the mirrors 6, 6' and are made to be incident to the object 7 obliquely at an incidence angle $\theta_1$. The diffracted lights 61, 62 form light spots of about 2 mm diameter which overlap each other on the object 7. The photo-detector 9 has a light-receiving portion 9a of 0.8 mm diameter on which the central portion of the overlapping light spots in diameter of 0.8 mm is projected in real size through the condenser lens 8. Thus, the light-receiving portion 9a of the photo-detector 9 efficiently receives the interference light formed by the scattered lights obtained from the diffracted lights 61, 62, and photo-electrically coverts the interference light into electrical signal. The photo-detector 9 therefore produces a signal corresponding to the Doppler frequency F which is obtained as F=2 V/d by substituting n=1 to the formula (5) and which is independent from the wavelength λ.

In this embodiment, the laser diode 1, collimator lens 2, condenser lens 8 and the photo-detector 7 are disposed outside the incident plane which contains the light pathes of both diffracted lights 61, 62 and these elements are disposed in a plane which is substantially parallel both to the diffraction grating 10 and the object 7, by virtue of provision of the double-sided mirror 12 which is disposed at an inclination between the diffraction grating 10 and the object 7. This embodiment, therefore, provides a velocity meter which is still compact as compared with the embodiment shown in FIGS. 10A and 10B. In fact, this embodiment makes it possible to reduce the distance h between the diffraction grating 10 and the object 7 to 20 mm or so, while reducing also the deviation of each of the light spots formed by the diffracted lights 61, 62 in response to 1% change in the laser diode oscillation frequency to 0.3 mm or so.

In the second to fourth embodiments described hereinbefore, the diffracted lights of ± first orders are used as a pair of the diffracted lights to be applied to the object 7. This, however, is only illustrative and the invention does not exclude the use of a pair of diffracted lights of the same order with opposite degrees such as ± second orders or ± third orders, as well as a combination of two diffracted lights of different orders.

In the second to fourth embodiments as described, the direction t of arrangement of the diffraction grating 10 coincides with the direction X of movement of the object 7. This, however, is only illustrative and the diffraction grating 10 may be inclined such that the direction t of arrangement of the grating is inclined to the moving direction X with respect to the Z-X plane, i.e., the incident plane containing the light paths of the pair of diffracted lights. Alternatively, the arrangement may be such that the collimated light from the light applying system 10 is made to impinge upon the diffraction grating 10 obliquely with respect to the incident plane. Any way, a precise measurement of velocity is made possible by arranging such that the pair of diffracted lights impinge upon substantially on the same point on the object 7 at a crossing angle which is substantially the same as the angle formed between these two diffracted lights when these lights are emitted from the diffraction grating 10.

In general, when a light having a large tendency of interference such as a laser beam is applied to an object, the light is scattered by the fine convexities and concavities so as to be phase-modulated in a random manner and forms a spot pattern which is a so-called speckle pattern on an observation surface such as a light-receiving surface on the photo-detector.

Therefore, in an ordinary Doppler velocity meter, when the object or the fluid is moved, a change in the brightness of the interference light caused by a Doppler shift is modulated by an irregular change of brightness caused by a flow of the speckle pattern. The output signal from the photo-detector also is modulated by a change in the transmittance (or reflectivity) of the object. The frequency of the change in the brightness caused by the flow of speckle pattern and the change in the frequency of the transmittance (or reflectivity) of the object are very low as compared with the Doppler frequency expressed by the formula (4). It is, therefore, a common measure to pass the output signal from the photo-detector through a high-pass filter so as to electrically remove the low-frequency components, thus picking up only the Doppler signal.

When the moving velocity of the object is very low, only a small difference exists between the Doppler frequency and the low-frequency components to be removed, so that it is not possible to use a high-pass filter. In such a case, it is impossible to measure the velocity of the object. In general, a laser Doppler velocity meter theoretically has no function for discriminating the moving direction (direction of movement of the object). This undesirably limits the use of the velocity meter.

Velocity meters of the invention which will be described hereinunder are capable of eliminating this problem, while offering the same advantages as those offered by the preceding embodiments.

Figure 14:
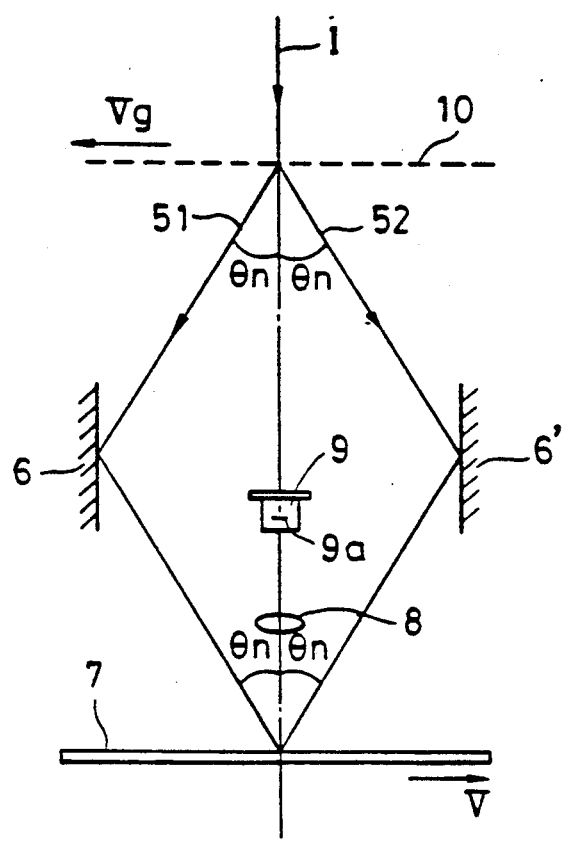
FIG. 14 is an illustration of a method for effecting frequency modulation by movement of a diffraction grating.

FIG. 14 schematically shows the manner in which a frequency modulation is conducted by the movement of the diffraction grating. The diffraction grating 10 having a grating pitch d moves at a constant velocity $V_g$ from the right to the left as viewed in FIG. 14. When the laser beam I is made to impinge upon the diffraction grating 10 which is being moved, the diffracted lights 51, 52 of the ±nth orders are positively and negatively Doppler-shifted by an amount expressed by $\pm V_g/nd$. The diffraction angle $\theta_n$ of the refracted lights 51 and 52 meets the condition of:

$$\sin \theta_n = \lambda/nd \qquad (8)$$

where, $\lambda$ represents the wavelength of the light.

When the the diffracted lights 51, 52 of the ±nth orders are applied via the mirrors 6, 6' to the object 7 moving at the velocity V such that each of the diffracted lights has an incident angle of $\theta_n$, the diffracted light 51 of the +n th order is Doppler-shifted in amount of $(V_g+V)/nd$, while the diffracted light 52 of the −n th order is Doppler-shifted in amount of $(V_g+V)/nd$. In this case, therefore, the Doppler frequency F is given by the following formula:

$$F = 2(V_g+V)/nd \qquad (9)$$

It is therefore possible to obtain Doppler frequency F which is independent from the wavelength of the laser beam.

As will be seen from the formula (9), it is possible to obtain the Doppler frequency F having a value which provides a large difference between the Doppler frequency and the low-frequency components caused by a change in the speckle pattern or transmittance (or reflectivity) of the object, by virtue of the movement of the diffraction grating 10 at the velocity $V_g$. It is therefore possible to pick up only the Doppler signal from the output of the photo-detector by eliminating low-frequency components of the output through a high-pass filter, thus enabling measurement of velocity even when the velocity is low. The velocity $V_g$ of movement of the diffraction grating 10 can be determined suitably in consideration of factors such as the velocity of the object, frequency characteristics of the high-pass filter, and so forth.

In the embodiment shown in FIG. 14, the diffraction grating 10 is moved from the right to the left as viewed in this Figure. This, however, is not exclusive and the diffraction grating 10 may be moved from the left to the right as viewed in this Figure. Movement of the diffraction grating in such a direction is effected when the moving velocity V of the object is very high. A very high moving velocity of the object 7 produces a very high Doppler frequency F, with the result that the frequency of the output signal from the photo-detector becomes correspondingly high. It is therefore necessary that the signal processing circuit for processing the output from the photo-detector 9 has superior frequency-responding characteristics. In such a case, the diffraction grating 10 is moved from the left to the right as viewed in FIG. 5, so that the velocity $V_g$ in formula (9) is changed to $-V_g$, thus reducing the level of the load on the circuit.

Figure 15:
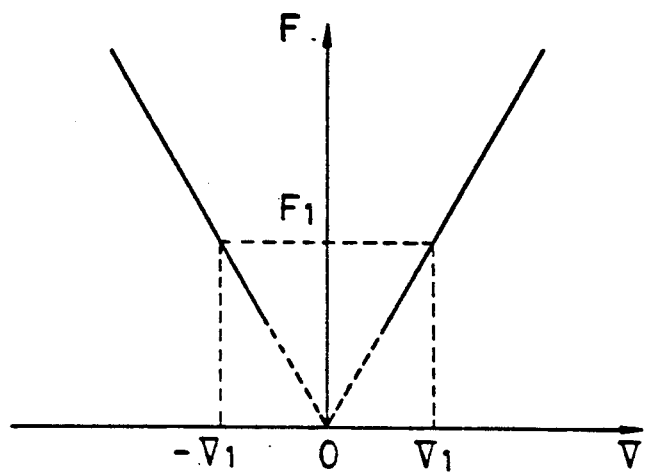
FIG. 15 is a graph showing the relationship between the velocity of an object and Doppler frequency.
Figure 15:
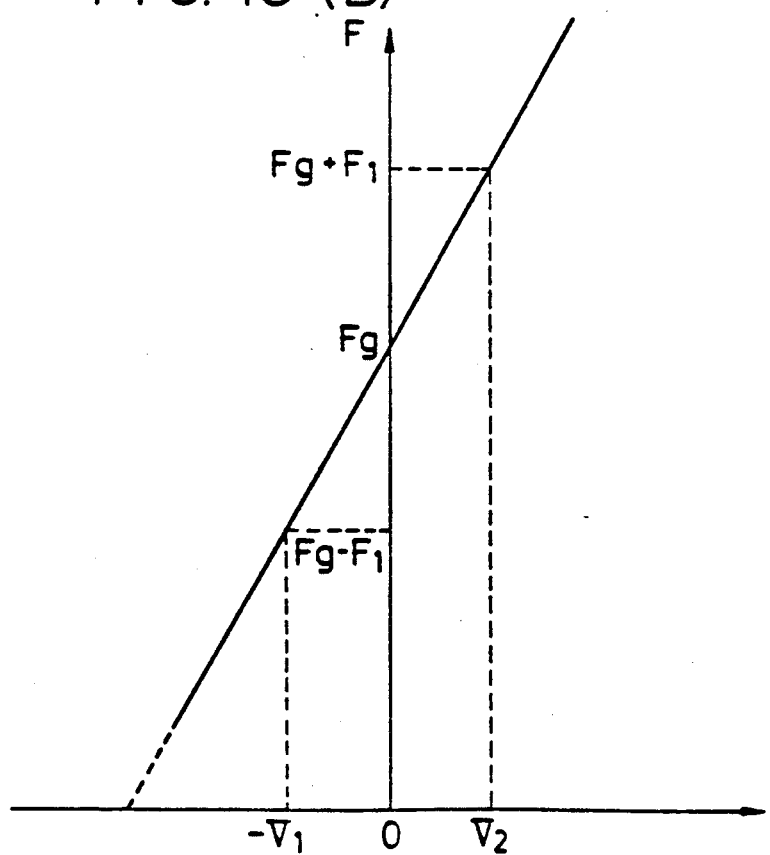

FIGS. 15A and 15B show the relationships between the velocity V of the object and the Doppler frequency. More specifically, FIG. 15(A) shows the relationship as obtained when the diffraction grating is fixed, while FIG. 15B shows the relationship as obtained when the diffraction grating is moved at a velocity $V_g$ in accordance with the arrangement shown in FIG. 14. As will be seen from FIGS. 15A and 15B, the frequency $F_1$ detected when the diffraction grating is fixed is a function of both the two velocities $V_1$ and $-V_1$ of different directions, so that it is impossible to discriminate the direction of movement of the object. In contrast, when the diffraction grating is moved, a Doppler frequency F expressed by $F = F_g + F_1$ is obtained for a velocity $V_1$, while a Doppler frequency F expressed by $F = F_g - F_1$ is obtained for a velocity $-V_1$, thus enabling the detection of not only the velocity but also of the direction of movement of the object, simultaneously.

As has been described, the laser Doppler velocity meter of the present invention can have a function for discriminating the direction of movement of the object.

Figure 16:
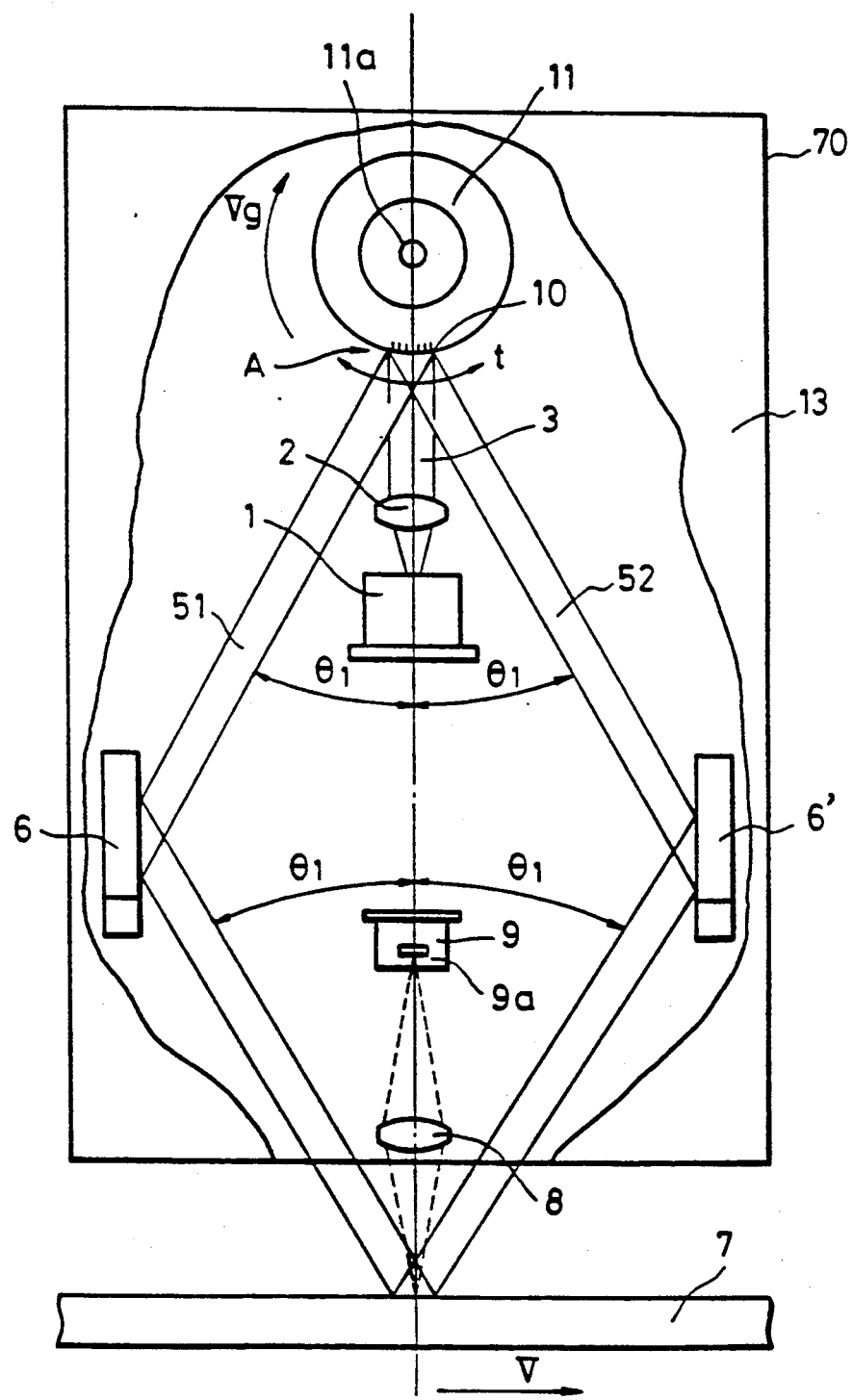
FIG. 16 is a schematic illustration of a fifth embodiment of the velocity meter in accordance with the present invention.

FIG. 16 schematically shows a fifth embodiment of the velocity meter in accordance with the present invention having a function for discriminating the direction of movement of the object. In this Figure, the same reference numerals are used to denote the same components as those appearing in FIG. 5 showing the first embodiment. Numeral 11 denotes a cylinder having a diffraction grating 10 of a grating pitch d of 1.6 μm formed on the inner peripheral surface thereof. The diffraction grating 10 is of reflection type and has grating lines (grooves) which extend in a direction perpendicular to the direction t of arrangement of the grating, i.e., in a direction perpendicular to the drawing sheet of FIG. 16. The diffraction grating 10 can be formed by periodically arranging reflective films of A, Au or the like or forming grooves periodically along the side surface of the member constituting the cylinder 11.

Thus, the diffraction grating 10 in this embodiment may be of amplitude type of phase (relief) type as in the cases of other embodiments. The cylinder 11 is secured to the drive shaft (rotor shaft) 11a of a motor, so that the cylinder 11 is rotated at a constant speed as the motor operates, whereby the diffraction grating 10 formed on the peripheral wall of the cylinder 11 is moved at a constant velocity $V_g$. The direction of movement of the diffraction grating 10 coincides with the direction t of arrangement of the grating. In this embodiment, the cylinder 11 is rotated clockwise so that the diffraction grating 10 at a point A is moved from the right to the left, i.e., in the counter direction to the movement of the object 7. Numeral 13 designates a frame in which various components and elements are encased.

This embodiment incorporates, as the laser 1, a laser diode capable of emitting a laser beam of a wavelength $\lambda$ of 0.78 $\mu$m, so as to realize a compact construction. The laser 1 may be a single mode laser or a multi-mode laser.

In operation, the laser beam from the laser diode 1 is collimated by the collimator lens 2 and the collimated beam of about 2 mm diameter impinges upon the reflection type refraction grating 10 in a direction perpendicular to the direction t of arrangement of the grating. The diffracted lights 51, 52 of the ± first orders are emitted from the diffraction grating 10 at the diffraction angle $\theta_1$ of about 29° and are directed respectively to the mirror 6, 6' which have reflective surfaces perpendicular to the direction t of arrangement of the grating and are reflected by these mirrors so as to impinge upon the object 7 at an incident angle of $\theta_1$. The diffracted lights 51, 52 form light spots of about 2 mm diameter which overlap each other on the object 7. The photo-detector 9 has a light-receiving portion 9a of 0.8 mm diameter on which the central portion of the overlapping light spots in diameter of 0.8 mm is projected in real size through the condenser lens 8. Thus, the light-receiving portion 9a of the photo-detector 9 efficiently receives the interference light formed by the scattered lights obtained from the diffracted lights 51, 52, and photo-electrically converts the interference light into electrical signal. The photo-detector 9 then produces an output corresponding to the Doppler frequency which is independent from the wavelength of the laser beam and which is determined in accordance with the velocity $V_g$ of the diffraction grating and the moving velocity V of the object 7 in accordance with the following formula (10) derived from the formula (9) by setting the number n of order as n=1. Since the moving velocity $V_g$ of the diffraction grating is constant, it is possible to measure the velocity V from the following formula (11).

$$F=2(V_g+V)/d \qquad (10)$$

$$V=F(d/2)-V_g \qquad (11)$$

The measurement of the velocity V of the object 7 is conducted in a manner shown below.

Figure 18:
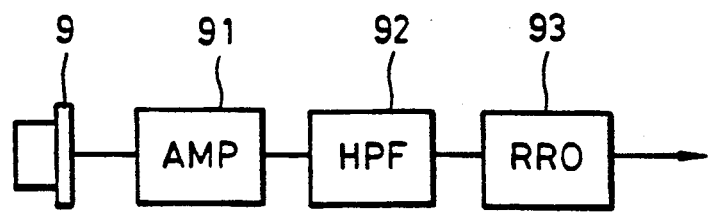
FIG. 18 is a block diagram of a circuit for receiving an output signal from a photodetector.

As shown in FIG. 18, the output signal from the photo-detector 9 is amplified by an amplifier 91 and the amplified signal is delivered to a processing circuit 93. The processing circuit executes the processing corresponding to the formula (11) and delivers a voltage corresponding to the velocity V of the object.

In this embodiment, the laser beam impinges upon the diffraction grating 10 in a direction perpendicular to the direction t of arrangement of the grating. As stated before, however, the precision of detection of the velocity of the object 7 does not have any dependency on the angle of incidence of the laser beam I. Furthermore, any fluctuation of the wavelength of the laser beam does not substantially affect the detection of velocity of the object 7 even when the diffraction grating 10 is inclined. In this embodiment, therefore, the position of the light applying system including the laser diode 1 and the collimator lens 2 relative to the diffraction grating 10 may be changed.

Figure 17:
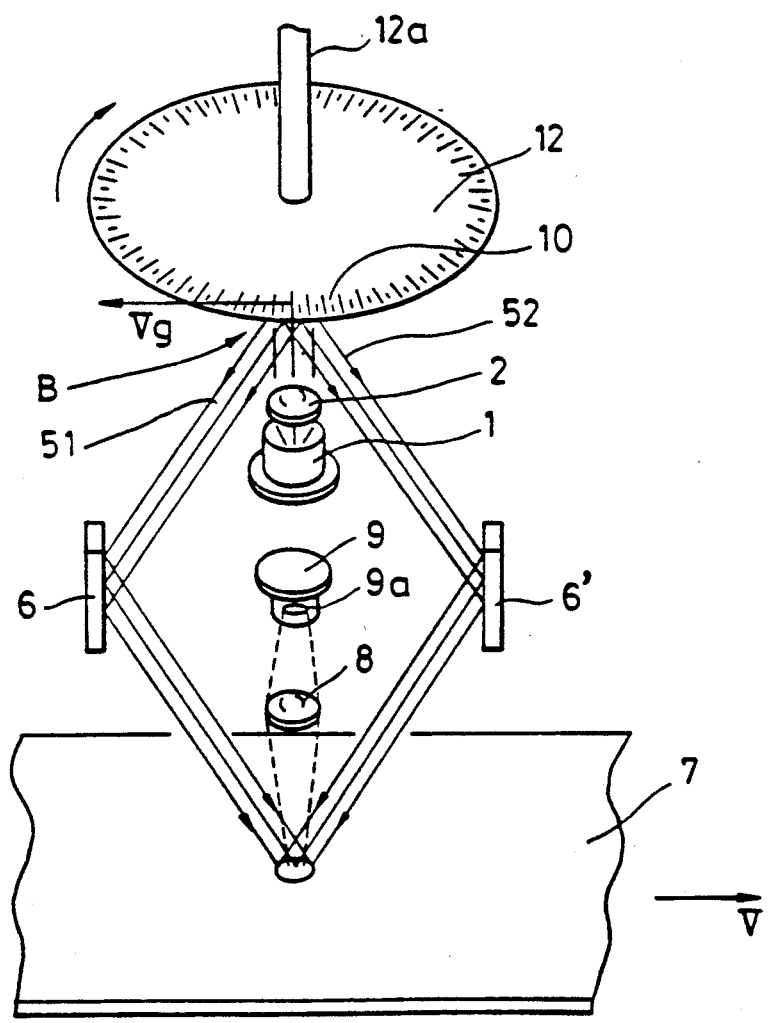
FIG. 17 is a schematic illustration of a sixth embodiment of the velocity meter in accordance with the present invention.

FIG. 17 schematically shows a sixth embodiment of the velocity meter in accordance with the present invention having a function for discriminating the direction of movement of the object. In this Figure, the same reference numerals are used to denote the same components as those appearing in FIGS. 5 and 16. Numeral 12 denotes a disk having a radial diffraction grating 10 of a grating pitch d of 1.6 $\mu$m formed on the peripheral end region thereof. The diffraction grating 10 in this embodiment may be of any desired type as in the cases of the embodiment shown in FIG. 16. The disk 11 is secured to the drive shaft (rotor shaft) 12a of a motor, so that the cylinder 11 is rotated at a constant speed as the motor operates, whereby the diffraction grating 10 formed on the peripheral wall of the cylinder 11 is moved at a constant velocity $V_g$. The direction of movement of the diffraction grating 10 coincides with the direction t of arrangement of the grating. In this embodiment, the cylinder 11 is rotated clockwise so that the diffraction grating 10 at a point B is moved from the right to the left, i.e., in the counter direction to the movement of the object 7. Numeral 13 designates a frame in which various components and elements are encased.

This embodiment incorporates, as the laser 1, a laser diode, though various other types of laser can be used as in the cases of other embodiments.

In operation, the laser beam from the laser diode 1 is collimated by the collimator lens 2 and the collimated beam of about 2 mm diameter impinges upon the reflection type refraction grating 10 in a direction perpendicular to the direction t of arrangement of the grating. The diffracted lights 51, 52 of the ±first orders are emitted from the diffraction grating 10 at the diffraction angle $\theta$ of about 29° and are directed respectively to the mirrors 6, 6' which have reflective surfaces perpendicular to the direction t of arrangement of the grating and are reflected by these mirrors so as to impinge upon the object 7 such as a paper at an incident angle of $\theta_1$. The diffracted lights 51, 52 form light spots of about 2 mm diameter which overlap each other on the object 7. The photo-detector 9 has a light-receiving portion 9a of 0.8 mm diameter on which the central portion of the overlapping light spots in diameter of 0.8 mm is projected in real size through the condenser lens 8. Thus, the light-receiving portion 9a of the photo-detector 9 efficiently receives the interference light formed by the scattered lights obtained from the diffracted lights 51, 52, and photo-electrically converts the interference light into electrical signal. The photo-detector 9 then produces an output corresponding to the Doppler frequency which is independent from the wavelength of the laser beam and which is determined in accordance with the formula (10). Then, as shown in FIG. 18, the output from the photo-detector 9 is delivered to a processing circuit 93 through an amplifier 91 and a high pass filter 92 so that a voltage signal corresponding to the velocity V of movement of the object 7 is derived from the processing circuit 93.

In the embodiment, the diffraction grating 10 has radial diffraction lines so that the diffracted lights 51, 52 of the ±first-order exhibit oval cross-section. Such a deformation of the beam cross-section, however, can be avoided if the disk 11 has a diameter large enough to enable the grating lines to be regarded as being materially parallel to each other.

In the embodiments shown in FIGS. 16 and 17, the object 7 moves unidirectionally from the left to the right as viewed in these Figures, and the optical systems are so arranged that the frequency of the output signal from the photo-detector 9 is gradually increased in accordance with the movement of the object. This, however, is only illustrative and the optical system in each of these embodiments may be arranged to detect both the moving velocity and the moving direction when the object is movable in two opposite directions. It is also possible to arrange the optical system such that the frequency of the output signal from the photo-detector 9 is lowered in response to the movement of the object. Thus, the diffraction grating is moved in each of the embodiments shown in FIGS. 16 and 17. Factors such as the grating pitch, moving velocity and the moving direction of the diffraction grating are determined in view of the effect or the precision to be attained.

The pair of reflection-diffracted lights of the ±first order generated by the diffraction grating 10 applied to the object 7 in each of the fifth and sixth embodiments may be substituted by other types of combination of diffracted lights such as a pair of transmission-diffracted lights which are diffracted through the diffraction grating, ±second-order diffracted lights generated by the diffraction grating, or ±third order diffracted lights generated by the diffraction grating. It is thus possible to form various types of laser Doppler velocity meter without difficulty.

As will be understood from the foregoing description, it is possible to precisely detect the velocity of movement of an object or the velocity of a moving fluid regardless of any change in the wavelength of the laser beam. It is also possible to arrange such that the photo-detector produces an output of a frequency higher or lower than a predetermined frequency. In addition, the velocity meter of the invention can be constructed so as to detect not only the velocity but also the direction of movement of an object.

Since the velocity meter can be arranged such that the photo-detector produces an output of a frequency higher than a predetermined frequency, the detection of velocity is possible even when the velocity of the moving object is very low, whereby the measuring range of the velocity meter can be remarkably broadened. Therefore, the detection of moving velocity of the object is made possible even when the movement of the object has been just started or movement is going to be stopped. The velocity meter of the invention is therefore usable also as a length measurement device for locating an object.

Figure 19:
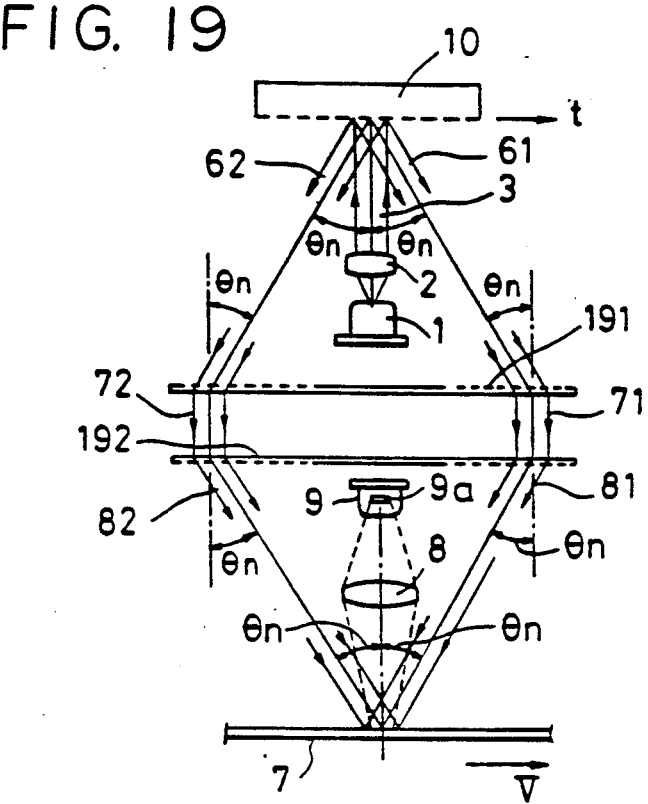
FIGS. 19 to 21 are schematic illustrations of a seventh embodiment of the velocity meter of the present invention.

FIG. 19 is a schematic illustration of a seventh embodiment of the velocity meter in accordance with the present invention. In this Figure, the same reference numerals are used to denote the same components or elements as those used in the first embodiment shown in FIG. 5. The seventh embodiment is different from the first embodiment shown in FIG. 5 in that transmission-type refraction gratings 191, 192 are used in place of the mirrors 6, 6' shown in FIG. 5. In the following description, the reflection-type diffraction grating 10 will be referred to as "first diffraction grating 10", while the diffraction gratings 191 and 192 will be respectively referred to as "second diffraction grating 191" and "third diffraction grating 192".

The light-receiving surfaces of the first, second and the third diffraction gratings are parallel to one another, and axes perpendicular to these light-receiving surfaces are parallel to the optical axes of the collimator lens 2 and the lens 8. The directions of arrangements of gratings of the second and third diffraction gratings 191, 192 are th same as that t of the first diffraction grating 10, and all the first to third diffraction gratings have an equal pitch of gratings represented by d=1.6 μm.

In addition, the first to third diffraction gratings are so arranged that the distance between the light-receiving surfaces of the first diffraction grating 10 and the second diffraction grating 191 is equal to the distance between the light-receiving surfaces of the third diffraction grating 193 and the object. The second and the third diffraction gratings 191 and 192 are relief-type diffraction gratings.

In operation, a laser beam of a wavelength λ substantially equal to 0.78 μm is collimated through a collimator lens 2 into a collimated beam 3 having a diameter of about 2 mm. The collimated beam impinges upon the first diffraction grating 10 substantially perpendicularly to the light-receiving surface of the diffraction grating 10. The first diffraction grating 10 reflects and diffracts the incident collimated beam 3. Consequently, the first diffraction grating 10 emits ±first-degree diffraction lights 61, 62 at a diffraction angle $\theta_n$ which is substantially equal to 29°. These diffracted lights 61, 62 are applied to the second diffraction grating 191. The arrangement is such that a diffracted light 72 of the order −1 obtained from the light 62 and a diffracted light 71 of +1 order obtained from the light 61 are emitted from the second diffraction grating 191 in parallel with each other and also in parallel with the collimated beam 3, i.e., the optical axis. These diffracted lights 71 and 72 are applied to the transmission-type diffraction grating 192. The arrangement is such that a diffracted collimated light 82 of −1 order obtained from the diffracted collimated light 72 and a diffracted collimated light 81 of +1 order obtained from the diffracted light 71 are emitted from the transmission-type diffraction grating 192. These diffracted lights 81 and 82 are directed toward the object 7 and are made incident to the object 7 at the incident angle $\theta_n$, whereby light spots of about 2 mm diameter are formed on the object 7. Then, as explained before in connection with FIG. 5, the photo-detector 9 determines the Doppler frequency F as follows, by substituting n=1 to the formula (5), upon receipt of the light reflected and scattered by the photo-detector 9.

$$F=2V/d \qquad (12)$$

When the emission wavelength λ of the laser diode 1 is changed, the angle $\theta_n$ is changed due to relation of d sin $\theta_n$ =λ. Nevertheless, the positions of the light spots formed by the diffracted lights 81 and 82 remain unchanged. In addition, these two light spots always overlap each other because the distance between the reflection-type diffraction grating 10 and the transmission-type diffraction grating 191 is made equal to the distance between the transmission-type diffraction grating 192 and the object 7.

Figure 20:
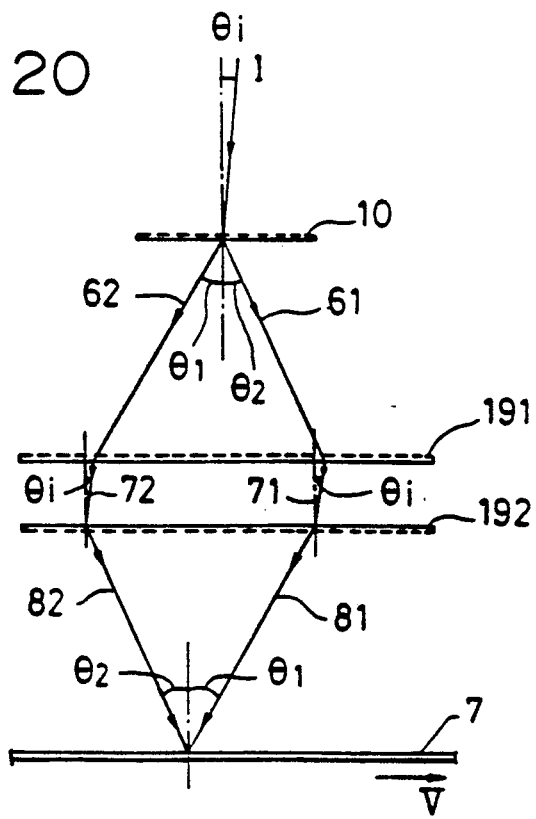

FIG. 20 shows an arrangement in which the first, second and the third diffraction gratings 10, 191 and 195 are arranged in parallel with one another, with a laser beam I incident to the first diffraction grating 10 at an incident angle $\theta_i$. The description in connection with FIG. 20 and FIG. 21 which will be mentioned later will proceed on an assumption that the first diffraction grating 10 is of a transmission type.

The angles $\theta_1$ and $\theta_2$ at which the transmission-diffracted lights 61 and 62 of +1 and −1 orders are emitted from the first diffraction grating 10 are expressed by the following formulae, when these angles are expressed in positive values:

$$\sin\theta_1 = \lambda/d + \sin\theta_i$$

$$\sin\theta_2 = \lambda/d - \sin\theta_i \quad (13)$$

Upon receipt of the diffracted lights 61 and 62, the second diffraction grating 191 emits parallel diffracted lights 71 and 72 at an angle $\theta_i$ and these lights 71 and 72 are further diffracted in the third diffraction grating 192 whereby diffracted lights 81 and 82 are obtained. These lights 81 and 82 impinge upon the object 7 at incident angles $\theta_1$ and $\theta_2$, respectively. The Doppler frequency F' produced by the scattered lights obtained from these diffracted lights 81 and 82 is given by the following formula.

$$F = \frac{2V\cos\{(\theta_1 - \theta_2)/2\}\sin\{(\theta_1 + \theta_2)/2\}}{\lambda} \quad (14)$$
$$= V(\sin\theta_1 + \sin\theta_2)/\lambda$$

From the formulae (13) and (14), the Doppler frequency F' is determined as follows:

$$F' = 2V/d \quad (15)$$

This frequency is the same as the frequency of the laser beam impinging upon the first diffraction grating 10 perpendicularly thereto (see formula (12)). It is therefore understood that the Doppler frequency has no dependency on the angle $\theta_i$ of incidence of the laser beam. The positions of the light spots 81 and 82 are not changed even when the emission wavelength $\lambda$ of the laser diode 1 is changed. Thus, the overlapping state of the two light spots on the object 7 is constantly maintained when the distance between the light-receiving surfaces of the first diffraction grating 10 and the second diffraction grating 191 is held equal to the distance between the light receiving surfaces of the third diffraction grating 192 and the object 7.

Figure 21:
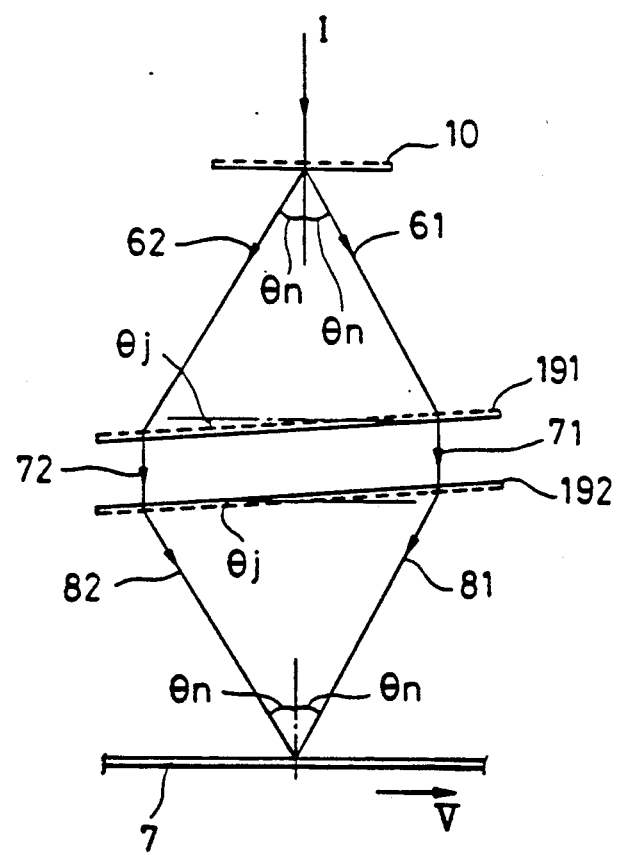

In FIG. 21, the first diffraction grating 10 is held such that its light-receiving surface is parallel to the object 7, while the second and third diffraction gratings 191 and 192 are situated such that their light-receiving surfaces are inclined at an angle $\theta_j$ to the planes parallel to the light-receiving surface of the first diffraction grating 10. Thus, the light-receiving surfaces of the second and third diffraction gratings 191, 192 are parallel to each other. Representing the angle of inclination of the diffracted lights 71 and 72 to the optical axis by $\theta$, these diffracted lights meet the following condition of formula (16) and advance towards the third diffraction grating 192 along the mutually parallel paths of light. Finally, the diffracted lights 71 and 72 impinge upon the object 7 at an incident angle $\theta_n$. Thus, the Doppler frequency F obtained in this case is the same as that derived from the formula (12). It is therefore understood that the positions of the light spots on the object 7 are maintained unchanged independently of the inclination of the light-receiving surfaces of the second and third diffraction gratings 191 and 192 relative to the diffracted lights 61, 62 of the orders ±1, provided that these light-receiving surfaces are parallel to each other.

The velocity meters shown in FIGS. 19 to 21 make use of the diffracted lights of the order ±1. This, however, is only illustrative and the velocity meters shown in these Figures can be constructed in such a manner as to utilize the diffracted lights of orders ±1 or ±2. It is also possible to arrange such that photo-detector 9 receives, through the lens 8, the lights transmitted and scattered by the object 7, although the velocity meters shown in FIGS. 19, 20 and 21 are arranged to receive the lights reflected and scattered by the object 7. It is thus possible to form a variety of types of velocity meter within the spirit of the present invention.

The reflection-type first diffraction grating 10 used in the velocity meter shown in FIG. 19 may be substituted by a transmission-type diffraction grating explained in connection with FIGS. 20 and 21. When a transmission-type diffraction grating is used as the first diffraction grating 10, the laser diode 1 and the collimator lens 2 are disposed on the side of the first diffraction grating 10 opposite to the object 7, as shown in FIGS. 20 and 21. Alternatively, the arrangement shown in FIG. 19 may be modified such that the second diffraction grating 191 is positioned above the first diffraction grating 10, while a reflection-type diffraction grating is used as the second diffraction grating 191. In any one of these arrangements, the second diffraction grating 191 receive the diffracted lights of the orders ±1 from the first diffraction grating 10 and diffracts these lights and emits the diffracted lights towards the third diffraction grating 192 along light paths which are parallel to the optical axis.

In the embodiment shown in FIG. 19, the second and the third diffraction gratings 191 and 192 may be provided on independent substrates. It is, however, advisable to form the second and the third diffraction gratings 191 and 192 on upper and lower surfaces of the plastic substrate so that these diffraction gratings 191, 192 can easily be set up in relation to each other.

In the embodiments shown in FIGS. 19 to 21, it is possible to detect the Doppler frequency without being affected by any change in the wavelength of the laser beam, while suppressing deviation of the two lights spots formed on the object, by virtue of the provision of a plurality of diffraction gratings. It is thus possible to obtain a highly accurate laser Doppler velocity meter capable of detecting velocity with a high degree of precision.

In addition, the design is appreciably facilitated because the points to which two beams are applied can be determined by many variable factors: namely, at least the constructions and positions of three diffraction gratings.

Figure 22:
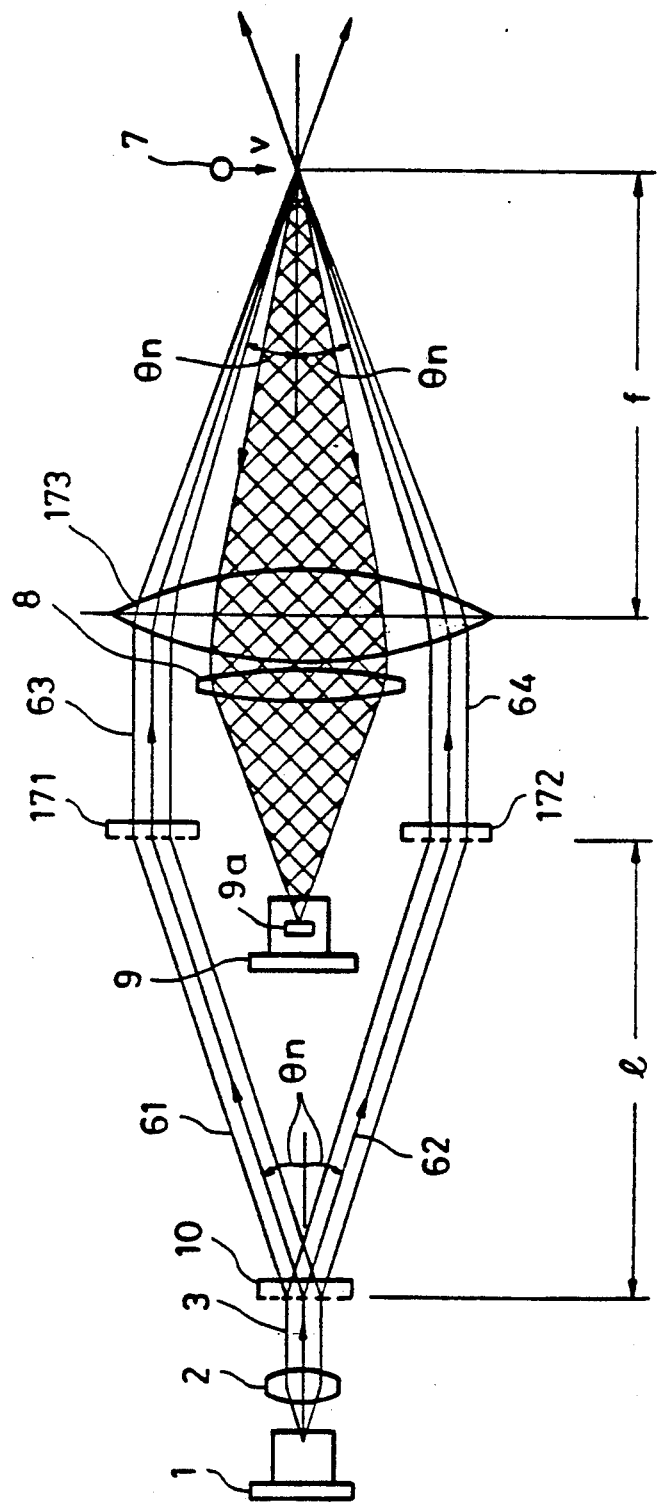
FIG. 22 is a schematic illustration of an eighth embodiment of the velocity meter of the present invention.

FIG. 22 is a schematic illustration of an eighth embodiment of the present invention. This embodiment is a laser Doppler velocity meter designed for measuring flowing velocity. In this Figure, the same reference numerals are used to denote the same components as these used in the velocity meter shown in FIG. 5. In this embodiment, therefore, the object 7 is a fluid flowing at a velocity V, while the diffraction grating denoted at 10 is a grating which is capable of generating transmitted diffracted lights.

The diffraction grating 10 will be referred to as "first diffraction grating 10", hereinafter. Numerals 171 and 172 denote second diffraction gratings, while 173 denotes a condenser lens 173. The first diffraction grating 10 and the second diffraction gratings 171 and 172 have the same grating pitch and the same direction of arrangement of grating. The first and second diffraction gratings 10, 171 and 172 are disposed such that axes perpendicular to the light-receiving surfaces of the first, second and third diffraction gratings 10, 171 and 172 are parallel to the optical axes of the lenses 2, 8 and 173. The distance between the light-receiving surface of the first diffraction grating 10 and those of the second diffraction 1 gratings 171, 172 along the above-mentioned optical axis and the distance between the lens 173 and the object 7 are equal to the focal distance $f_1$ of the lens 173. In this embodiment, the positions of the first and second diffraction gratings 10, 171 and 172 are determined to meet the condition of l=f. This, however, is not exclusive and the positions of the diffraction gratings may be determined so as not to meet the condition of l=f.

The laser beam emitted from the laser diode 1 is collimated through a collimator lens 2 into a collimated light beam 3 which impinges upon the light-receiving surface of the diffraction grating 10 perpendicularly thereto. The diffraction grating 10 diffracts the incident light beam 3 so that a diffracted light 61 of the order +1 and a diffracted light 62 of the order −1 are emitted from the diffraction grating 10 at an emission angle (diffraction angle) $\theta_n$. The diffracted light 61 of the order +1 impinges upon the second diffraction grating 171 and is diffracted by the latter so as to be emitted from this diffraction grating 171 in a direction substantially parallel to the optical axis of the lenses 8 and 173. On the other hand. On the other hand, the diffracted light 62 of the order −1 impinges upon the second diffraction grating 172 and is diffracted by the latter so as to be emitted from this diffraction grating 172 in a direction substantially parallel to the optical axis of the lenses 8 and 173.

Thus, the diffracted lights 61 and 62 of the orders ±1 are diffracted by the second diffraction gratings 171 and 172, respectively, at the diffraction angle $\theta_n$. The diffracted light 64 of the order +1 from the diffraction grating 171 and the diffracted light 64 from the diffraction grating 172 run along optical paths which are parallel to each other, so as to impinge upon peripheral portions of the lens 173. The lens 173 deflects and condenses the diffracted lights 63 and 64 of the orders ±1 and direct them to the focal point of the lens 173. Consequently, the diffracted lights 63 and 64 of the orders ±1 are superposed at the focal point of the lens 173 so as to form light spots. The angles of incidence of both diffracted lights 63, 64 of the orders ±1 are $\theta_n$ which is equal to the angle of emission of the respective diffracted lights from the diffraction grating 10. The diffracted lights of the orders ±1 can be regarded as being materially parallel to each other in the region adjacent to the focal point.

The object 7 moves at a position which is spaced from the lens 173 by a distance f, i.e., across the focal point of the lens 173, so that the light spots are formed by the diffracted lights 63, 64 of the orders ±1 on the object 7.

The lights thus applied to the object 7 are scattered by the object and are collimated through the lens 173 and then directed to the light-receiving portion 9a of the photo-detector 9 through the lens 8. Thus, the light-receiving portion 9a of the photo-detector 9 receives an interference light which contains both the scattered light generated as a result of application of the diffracted light 63 of the order +1 and the scattered light produced as a result of application of the diffracted light 64 of the order −1. The photo-detector 9 then photoelectrically converts this interference light and then produces a signal corresponding to Doppler frequency.

In the described embodiment, the lenses 8 and 173 are arranged so as to project the image of the object 7 to the light-receiving portion 9a of the photo-detector 9, so that the scattered lights from the object 7 are efficiently received by the light-receiving portion 9a. These lenses 8 and 173 may be so arranged as to project the image in real size or in a greater or smaller scale.

In this embodiment, the optical system is arranged such that the angle formed between the diffracted lights 61 and 62 of the orders ±1 emitted from the diffraction grating 10 is equal to the angle formed between the diffracted lights 63 and 64 of the orders ±1 incident to the object 7. This angle varies in accordance with a change in the frequency, i.e., the wavelength λ, of the laser beam to meet the condition of sin $\theta_n/\lambda$.

Therefore, the Doppler frequency F of the interference light is determined by th aforementioned formula (5). It is therefore possible to obtain from the photo-detector 9 a signal which exactly corresponds to the Doppler frequency without being affected by any change in the frequency of the laser beam.

In this embodiment, as shown in FIG. 22, the optical system 171, 172, 173, which causes the diffracted lights 61, 62 (64, 64) of the orders ±1 emitted from the diffraction grating 10 to be applied to the object 7, is arranged so as to substantially attain an optically conjugate relation between the light-receiving surface of the diffraction grating 10 and the object 7. Therefore, the diffracted lights 63 and 64 of the orders ±1 can always be efficiently superposed on each other at the surface of the object 7, regardless of any change in the diffraction angle of the diffracted lights 61 and 62 of the orders ±1 caused by a change in the frequency of the laser beam. It is thus possible to eliminate deviations of the light spots formed by the diffracted lights 63 and 64 of the orders ±1, as in the case of the seventh embodiment described before. This makes it possible to efficiently direct the interference light to the light-receiving portion 9a of the photo-detector 9, thus offering a high detection sensitivity of the velocity meter.

Figure 23:
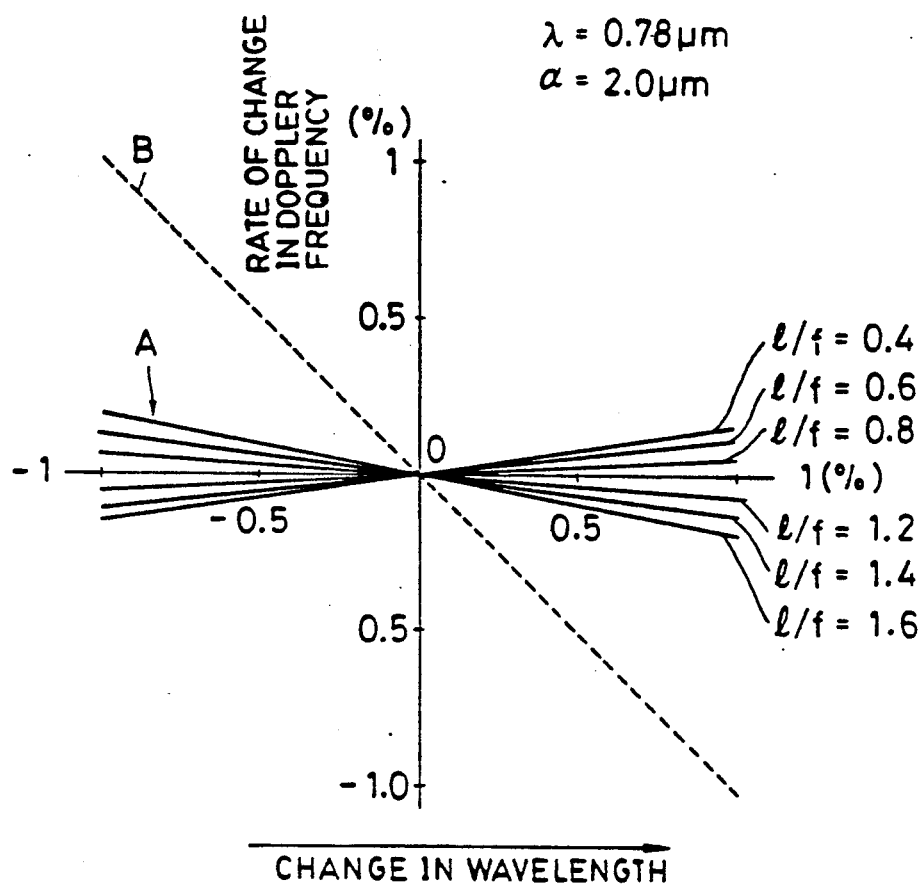
FIG. 23 is a graph showing the relationship between a change in the wavelength of a laser beam and a change in the Doppler effect.

In the velocity meter shown in FIG. 22, the distance l between the first diffraction grating 10 and the second diffraction gratings 171, 172 is determined to be equal to the focal distance f of the lens 173. However, even if the above-mentioned distance l is not equal to the focal distance f, the amount of change in the Doppler frequency in response to a change in the frequency (wavelength) of the laser beam is extremely small as shown in FIG. 23, provided that the system is designed and arranged in accordance with the concept of the present invention. FIG. 23 shows the amount of change in the Doppler frequency F caused by a change in the wavelength of the laser beam, using the ratio l/f as a parameter, when the wavelength λ of the laser beam, grating pitch d and the number n of order of refraction are determined as λ=0.78 μm, d=2 μm and n=1.

Figure 1:
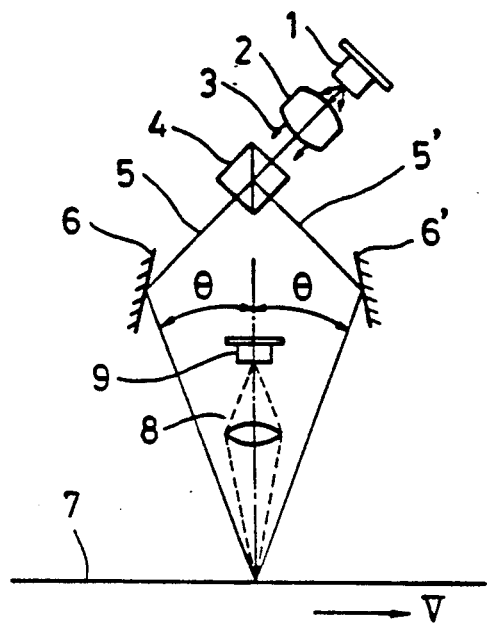
FIG. 1 is a schematic illustration of a known laser Doppler velocity meter.
Figure 2:
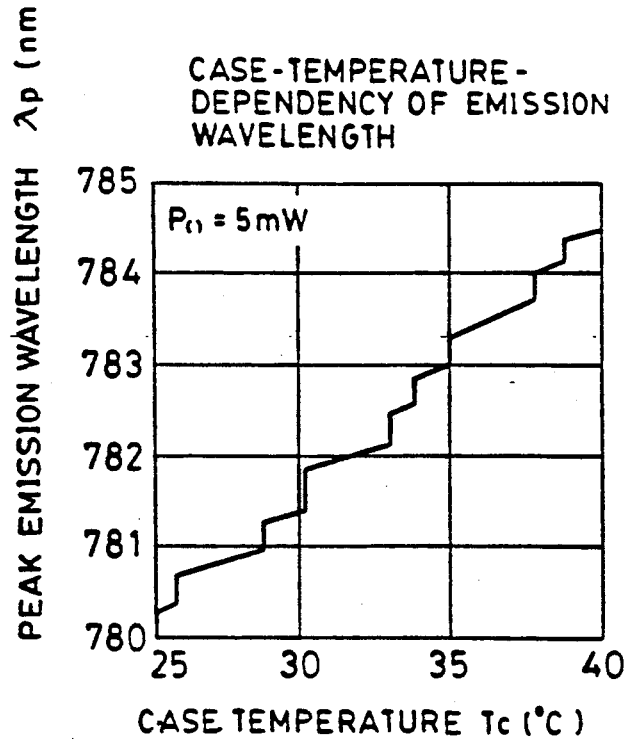
FIG. 2 is a graph illustrating an example of temperature-dependency of emission wavelength of a laser diode.

In this Figure, a broken-line curve B shows the characteristics of a conventional velocity meter shown in FIG. 1. It will be seen that, in this conventional velocity meter, the Doppler frequency is changed in proportion to a change in the wavelength of the laser beam. In contrast, in the velocity meter of the present invention, the amount of change in the Doppler frequency in response to a change in the wavelength of the laser beam is very small even when the distance l between the first diffraction grating 10 and the second diffraction gratings 171, 172 is not equal to the focal distance f of the lens 173. It is therefore possible to suitably set the distance 1 between the first diffraction grating 10 and the second diffraction gratings 171, 172.

Figure 24:
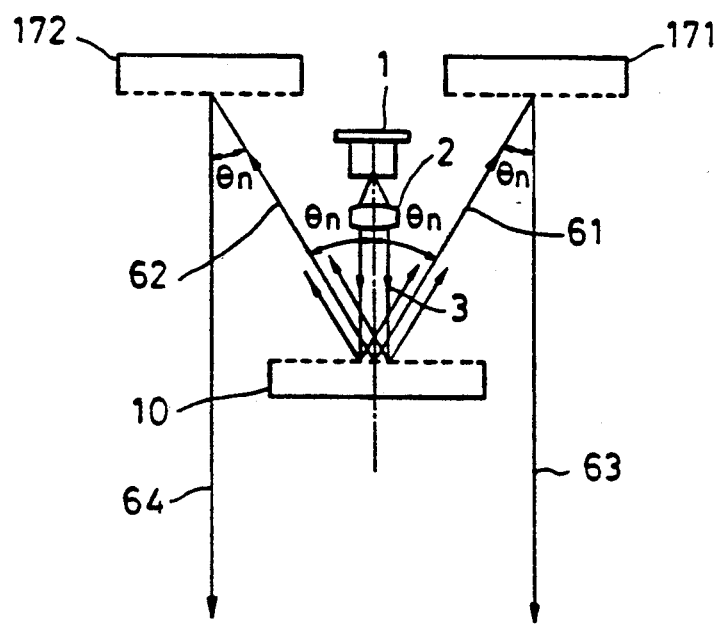
FIG. 24 is a fragmentary schematic illustration of a modification of the velocity meter shown in FIG. 22.

FIG. 24 is a fragmentary schematic illustration of a modification of the velocity meter shown in FIG. 22. In this modification, reflection-type diffraction gratings are used as the diffraction gratings 10, 171 and 172. Other components of the modification shown in FIG. 24 are materially the same as those shown in FIG. 22. Various forms of the reflection-type diffraction gratings 10, 171 and 172 are adoptable as explained before in connection with FIG. 5.

Referring to FIG. 24, the laser beam emitted from the laser diode 1 is collimated into a beam 3 through a collimator lens 2. The collimated beam impinges upon the light-receiving surface of the first diffraction grating 10 perpendicularly thereto. The first diffraction grating 10 reflects and diffracts the incident collimated beam 3 so that diffracted lights 61 and 62 of the orders ±1 are emitted from the first diffraction grating 10 at a diffraction angle $\theta_n$. The diffracted beam 61 of the order +1 obliquely impinges upon the second diffraction grating 171 and is reflection-diffracted by this grating and emitted therefrom in a direction parallel to the optical axis of the collimator lens 2. On the other hand, the diffracted beam 62 of the order −1 obliquely impinges upon the second diffraction grating 172 and is reflection-diffracted by this grating and emitted therefrom in a direction parallel to the optical axis of the collimator lens 2. The diffraction angles of these diffracted lights 61 and 62 of the orders ±1 are the same and equal to the above-mentioned diffraction angle $\theta_n$. The diffracted lights 63, 64 of the orders ±1 from the second diffraction gratings 171, 172 are collimated beams and are made incident to the lens 173 (see FIG. 22). The portions of the system on the light output side of the second diffraction gratings 171, 172 are exactly the same as those in the velocity meter shown in FIG. 22 and detailed description of such portions is therefore omitted.

A description will be given of another form of the embodiment which makes use of a reflection-type diffraction grating as the first diffraction grating 10 as in the embodiment shown in FIG. 24. In the arrangement shown in FIG. 24, the laser diode 1 and the collimator lens 2 are disposed on the side of the first diffraction grating 10 opposite to the lens 173. This arrangement, however, may be changed such that the laser diode 1 and the collimator lens 2 are disposed on the same side of the first diffraction grating as the lens 173, as shown in FIG. 5. In such a case, the second diffraction gratings 171, 172 and the components on the output side of the second diffraction gratings 171, 172 are arranged in the same manner as those in FIG. 22. This arrangement is preferred since the whole velocity meter can have a compact design.

The embodiment shown in FIG. 24 also may be modified also such that a transmission-type diffraction grating is used as the first diffraction grating 10, and that the laser diode 1 and the collimator lens 2 are disposed on the same side as the first diffraction grating 10 as the lens 173, so that the diffracted lights of the orders ±1 are directed towards the second diffraction gratings 171 and 172. This arrangement also contributes to a reduction in the size of the velocity meter.

In the embodiment shown in FIG. 22, the diffracted lights 61 and 62 of the orders ±1 are diffracted by the second diffraction gratings and the diffracted lights 63 and 64 of the orders ±1 from these second diffraction gratings are deflected by the lens so as to be directed to the object 7. This arrangement, however, may be modified such that the lights 61 and 62 of the orders ±1 are deflected by a lens so as to become parallel diffracted lights 63 and 64 of the orders ±1 and these diffracted lights 63 and 64 are then diffracted and deflected by the second diffraction gratings so as to be directed to the object 7. When such an alternative arrangement is adopted, the system is arranged such that the distance between the lens and the light-receiving surface of the first diffraction grating is equal to the focal distance of the lens. In a preferred form of the present invention, the laser beam from the laser diode is converged on the light-receiving surface of the first diffraction grating through a lens having a comparatively large focal distance so that the diffracted lights of the orders ±1 are emitted from the first diffraction grating in a diverging manner. These two diffracted lights are then deflected by the lens so as to become parallel light beams which are directed to the respective second diffraction gratings. These diffracted lights are then diffracted by the second diffraction gratings so as to be directed to the same point on the object.

Some of the velocity meters described hereinabove employs a pair of second diffraction gratings such that each second diffraction grating receives one of the diffracted lights of orders ±1. The use of two separate diffraction gratings, however, are not exclusive. Namely, it is possible to use a single diffraction grating having a comparatively large length, in lace of the pair of separate gratings.

It is also to be understood that the diffracted lights to be applied to the object 7 may be of orders such as ±2, ±3 and so on, although diffracted lights of orders ±1 are specifically mentioned in the foregoing description.

In addition, the flow velocity meter of the present invention may be arranged so as to detect the light transmission-scattered by the object, although the described embodiments are arranged to sense light reflection-scattered by the object.

In the embodiment shown in FIG. 22, the first diffraction grating 10 and the object 7 are arranged substantially in optically conjugate relation to each other with respect to the second diffraction gratings and the lens. This arrangement may be modified such that a lens is used in place of the second diffraction grating so that the first diffraction grating and the object are arranged substantially in a conjugate relation to each other through a lens assembly including the pair of lenses (referred to as "first lens" and "second lens", hereinafter). The optical system which makes use of this lens assembly is preferred because it can project the image of the first diffraction grating exactly on the object. When such a lens assembly is used, it is necessary that the distance between the first diffraction grating and the first lens which receives the ±1 orders of diffracted lights from this grating is determined to be equal to the focal length of the first lens, and that the distance between the object and the second lens which transmits the diffracted lights of the orders ±1 from the first lens to the object is determined to be equal to the focal length of the second lens. Preferably, the first lens and the second lens have an equal focal length. In this arrangement, the laser beam from the laser diode is converged in the light-receiving surface of the first diffraction grating through a lens having a comparatively large focal distance so that the diffracted lights of the orders ±1 are emitted from the first diffraction grating in a diverging manner. These diverging diffracted lights of the orders ±1 are then changed into parallel beams through the first lens and thee two diffracted beams parallel to each other are directed to the second lens which deflects and converges these two diffracted lights of the orders ±1 so as to direct these lights to the same point on the object.

Although in the described embodiments the optical systems are composed of lenses and diffraction gratings, these optical systems can employ reflection mirrors in place of the described components of these optical systems. Other modifications are also possible. For instance, the single lenses 2, 8 and 173 used in the embodiments shown in FIGS. 5, 22 and 24 may be replaced with a single optical system composed of a plurality of elementary lenses.

In the embodiments described hereinbefore, a single laser beam from a laser diode is divided into a plurality of beams and directed to preselected directions by a diffraction grating. This arrangement, however, maybe modified such that a single laser beam is divided into a desired number of beams necessary for the velocity measurement, and these beams are then diffracted and deflected by diffraction means. In such a case, the arrangement may be such that one diffraction grating used for each of the beams or a single diffraction grating for a plurality of beams as in the described embodiments.

Thus, various changes and modifications of velocity meter are possible according to the spirit of the invention.

Figure 25:
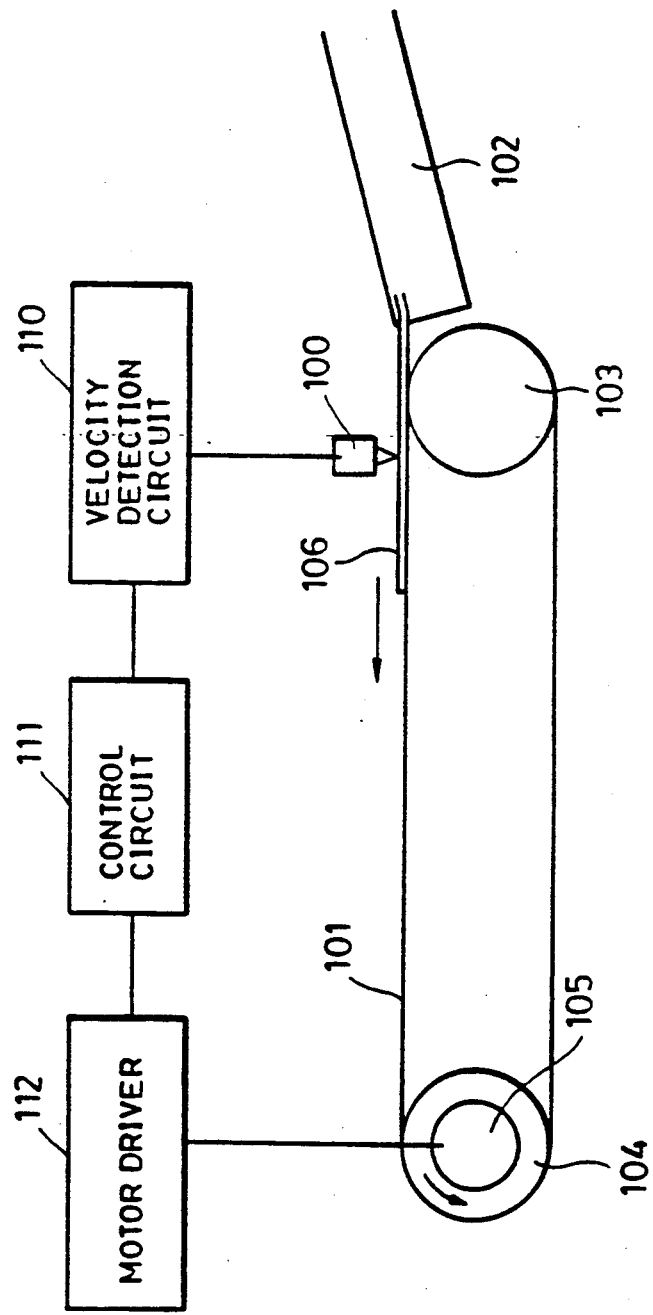
FIGS. 25, 26 and 27 are schematic illustrations of different image recording apparatus incorporating velocity meters embodying the present invention.

FIG. 25 is a schematic illustration of a system incorporating a velocity meter of the present invention, for the purpose of control of a recording paper in a facsimile.

In FIG. 25, the velocity meter of the invention, generally denoted by a numeral 100, can have any one of the first to eighth embodiments described hereinbefore. A paper supply unit 102 is capable of supplying a sheet of recording paper 106 onto a belt 101 which is stretched between a belt roller 104 which is supported by the chassis of the facsimile and a drive roller 104 which is connected to and driven by a drive motor 105 in the direction of an arrow thereby driving the belt 101.

The paper 106 supplied from the paper supply unit 102 is placed on the belt 101 so as to be moved in the direction of an arrow as the belt 101 runs. The velocity meter 100 is adapted to apply a laser beam to the surface belt 101 and to receive the light reflection-scattered by the paper 106 or the belt 101, in a manner explained before in connection with first to eighth embodiment. In this embodiment, the output signal from the photo-detector of the velocity meter 100, corresponding to the Doppler frequency, is input to a velocity detection circuit 110 of the facsimile. The velocity detection circuit 110 detects the velocity of movement of the paper 106 or the belt 101 on the basis of the frequency of the output signal derived from the photo-detector. The velocity information thus obtained from the circuit 110 is input to a control circuit 111 which controls the speed of the drive motor 105 through a motor driver 112. More specifically, the control circuit 111 inputs a correction signal to the driver 112 which then controls the speed of operation of the drive motor 118 so as to maintain a constant moving velocity of the belt 101 and, hence, of the paper 106. This makes it possible to eliminate various problems encountered with a known facsimile which relies solely on a feedback control of the drive roller, such as a periodical change in the moving velocity of the belt attributable to a slight eccentricity of the drive roller. Thus, the feed of the recording paper at constant velocity can be effected with a higher degree of precision, by virtue of use of the velocity meter of the present invention.

The velocity meter of the present invention, which is small in size and which can be assembled from a small number of parts as described before, is inexpensive and can be effectively used in a facsimile or other image recording apparatus without substantially raising the cost of such apparatus.

Referring again to FIG. 25, an image is recorded by a print head (not shown) on the paper 106 which is being fed at a constant speed. Since the feed of the paper 106 is conducted at an exactly constant velocity in the direction of sub-scanning during recording, it is possible to obtain a high quality of the recorded image.

In the embodiment shown in FIG. 25, the velocity meter of the present invention is used for the purpose of recording (printing) of an image in a facsimile as a typical example of image recording apparatus. This, however, is only illustrative and the velocity meter of the present invention can be used also for the purpose of reading of an image.

Figure 26:
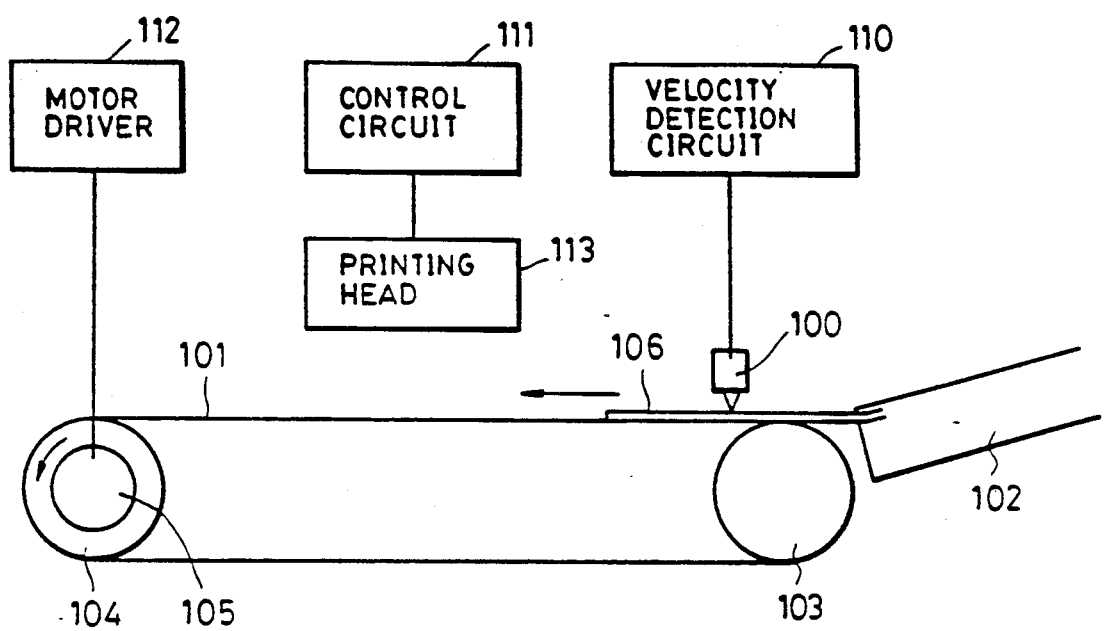

FIG. 26 schematically shows a system in which a velocity meter in accordance with the present invention is used for controlling the timing of recording of a bubble jet printer.

In FIG. 26, the velocity meter of the invention, generally denoted by a numeral 100, can have any one of the first to eighth embodiments described hereinbefore. A paper supply unit 102 is capable of supplying a sheet of recording paper 106 onto a belt 101 which is stretched between a belt roller 104 which is supported by the chassis of the facsimile and a drive roller 104 which is connected to and driven by a drive motor 105 in the direction of an arrow thereby driving the belt 101.

The paper 106 supplied from the paper supply unit 102 is placed on the belt 101 so as to be moved in the direction of an arrow as the belt 101 runs. The velocity meter 100 is adapted to apply a laser beam to the surface of the moving paper 106 or a portion of the surface of the belt 101 and to receive the light reflected and scattered by the paper 106 or the belt 101, in a manner explained before in connection with first to eighth embodiment. In this embodiment, the output signal from the photo-detector of the velocity meter 100, corresponding to the Doppler frequency, is input to a velocity detection circuit 110 of the facsimile. The velocity detection circuit 110 detects the velocity of movement of the paper 106 or the belt 101 on the basis of the frequency of the output signal derived from the photo-detector. The velocity information derived from the circuit 110 is input to a control circuit 111 which controls the timing of the recording operation performed by a recording head 113 for recording an image on the paper 106.

Figure 27:
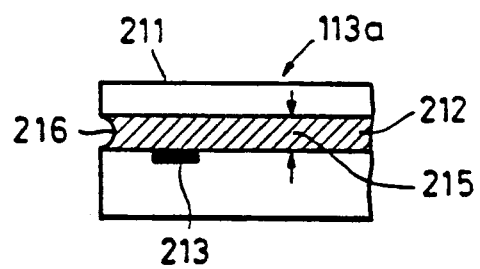
Figure 27:
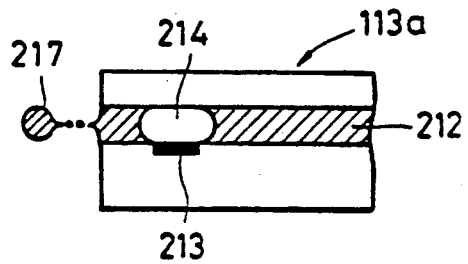

FIGS. 27A and 27B are sectional views of an essential portion of the recording head 113 shown in FIG. 26.

The recording head has a head unit 211 which carries a heat-generating element 213 which converts electric energy supplied thereto into heat energy and delivers the heat energy to a recording ink 212. Numeral 214 denotes a bubble formed in the ink, while 215 denotes a discharge passage.

In operation, the heat-generating element 213 generates a heat energy in an amount corresponding to the electric energy supplied thereto, and delivers the heat energy to the recording ink 212, so that the bubble 214 is formed in the ink in the ink discharge passage. The bubble 214 displaces the ink so that an ink droplet 217 is discharged from a discharge port 216 onto the surface of a recording medium, e.g., the paper 206, whereby a dot of ink is formed on the surface of the recording medium.

The control circuit 111 used in the embodiment shown in FIG. 26 is capable of changing the timing of supply of the electric energy to the heat-generating element 213 thus controlling the timing of the recording operation. The recording head 113 has a multiplicity of head units of the type shown in FIG. 27 arrayed in a direction parallel to the surface of the recording medium, such that each head unit corresponds to one pixel or dot of the image to be formed. It is therefore possible to record a desired dot pattern in the direction of main scanning perpendicular to the drawing sheet of FIG. 26 on the paper 106 which is moved along a path immediately under the recording head 113 as viewed in FIG. 26. This recording operation of the recording head 113 is conducted at a predetermined recording timing during the movement of the paper 106 in the direction of sub-scanning, i.e., in a direction shown by an arrow, so that dot patterns are formed on the successive main scanning lines, whereby a two-dimensional image is recorded on the paper 106.

The velocity of movement of the paper 106 (belt 101) is detected by the velocity meter 100 and the circuit 110 as explained before, and thus obtained velocity information is supplied to the control circuit 111. The control circuit 111 then compares with the detected velocity with a reference paper feeding velocity $V_0$. When the reference velocity $V_0$ is exceeded by the detected velocity, the control circuit 111 operates so as to advance the timing of recording operation of the recording head 113, whereas, when the detected velocity of the paper is lower than the reference velocity $V_0$, the control circuit 111 operates so as to delay the recording timing. The control of the recording timing performed by the control circuit 111 makes it possible to obtain a constant pitch of dot patterns also in the sub-scanning direction, thus ensuring high quality of the recorded image.

What is claimed is:

1. A laser Doppler velocity meter comprising:
   a laser for emitting a laser beam,
   an optical system for substantially collimating said laser beam and for separating the collimated laser beam from said laser into a first beam and a second beam and applying said first and second laser beams to an object at an incident angle $\theta$ respectively, said optical system including a collimator lens for transforming said laser beam from said laser into parallel beams and a diffraction grating arranged to receive the laser beam from said collimator lens in a direction substantially perpendicular to the direction of arrangement of the grating and for generating a +n th light as the first beam and a −n th light as the second beam where n is a natural number, said optical system directing said first and second beams such that said first and second beams cross each other at a point on said object such that an angle formed between said first and second beams is equal to an angle formed between said first and second beams when these beams are emitted from said diffraction grating, and said optical system changing the incident angle $\theta$ in accordance with the wavelength $\lambda$ of said laser beam so that $(\sin\theta)/\lambda$ is substantially constant; and
   a detector for detecting the scattered light generated on said object in response to the application of said first and second beams, said detector outputting a signal in accordance with a velocity proportional to a frequency of said scattered light;
   said optical system further including:
   second diffraction gratings having a grating pitch substantially equal to that of the said diffraction grating and capable of diffracting said first and second beams respectively, thereby directing said first and second beams along parallel light paths; and
   a deflector for deflecting said first and second beams from said second diffraction gratings so as to direct said first and second beams to said object.

2. A laser Doppler velocity meter according to claim 1, wherein said deflector includes a third diffraction grating for diffracting and deflecting said first and second beams, said third diffraction grating having a grating pitch substantially equal to that of said second diffraction gratings.

3. A laser Doppler velocity meter according to claim 1, wherein said deflector includes a lens system for refracting and deflecting said first and second beams, said lens system being mounted such that its focal point is positioned on said object.

4. A laser Doppler velocity meter comprising:
   a laser for emitting a laser beam;
   an optical system for substantially collimating said laser beam and for separating the collimated laser beam from said laser into a first beam and a second beam and applying said first and second laser beams to an object at an incident angle $\theta$ respectively, said optical system including a collimator lens for transforming said laser beam from said laser into parallel beams and a diffraction grating arranged to receive the laser beam from said collimator lens in a direction substantially perpendicular to the direction of arrangement of the grating and for generating a +n th light as the first beam and a −n th light as the second beam where n is a natural number, said optical system directing said first and second beams such that said first and second beams cross each other at a point on said object such that an angle formed between said first and second beams is equal to an angle formed between said first and second beams when these beams are emitted from said diffraction grating, and said optical system changing the incident angle $\theta$ in accordance with the wavelength $\lambda$ of said laser beam so that $(\sin\theta)/\lambda$ is substantially constant; and
   a detector for detecting the scattered light generated on said object in response to the application of said first and second beams, said detector outputting a signal in accordance with a velocity proportional to a frequency of said scattered light,
   wherein said diffraction grating is capable of reflection-diffracting said collimated beam and said detector detects light reflection-scattered by said object, and
   wherein the portion on which said collimated beam impinges on said diffraction grating and the portion at which said reflection-scattered light is generated are substantially or almost opposite to each other.

5. A laser Doppler velocity meter according to claim 4, wherein said laser is disposed at a position outside the plane containing the paths of said first and second beams.

6. A laser Doppler velocity meter according to claim 4, wherein said detector is disposed at a position outside a plane containing the paths of said first and second beams.

7. A laser Doppler velocity meter comprising:

a laser for emitting a laser beam;

an optical system including a diffraction grating for diffracting and deflecting said laser beam so as to generate first and second diffracted beams, said diffraction grating receiving said laser beams in a direction substantially perpendicular to the direction of arrangement of the grating, said first and second diffracted beams being beams of +n th and —n th order, respectively, where n is a natural number, and said optical system directing, regardless of a change in wavelength of said laser beam of said laser, said first and second diffracted beams to said object such that said first and second diffracted beams cross on said object at an angle which is almost the same as that of said first and second diffracted beams emitted from said diffraction grating; and a detector capable of detecting an interference beam which is formed as a result of an interference between a first scattered light formed on said object by said first diffracted beam and a second scattered light formed on said object by said second diffracted beam, and converting said interference beam into a signal proportional to a velocity, wherein said diffraction grating forms said first and second diffracted beams by reflection-diffracting said laser beam;

wherein said detector is disposed to detect said first and second scattered light; and wherein the portion on which said laser beam impinges on said diffraction grating and the portion at which said first and second scattered lights are generated are substantially or almost opposite to each other.

8. A velocimeter comprising:

beam applying means including beam source means for supplying a beam which is collimated and a diffraction grating arranged to be impinged by the beam from said beam source means in a direction substantially perpendicular to the direction of arrangement of said diffraction grating and for generating a diffracted beam of +n th order and a diffracted beam of —n th order, said beam applying means applying said diffracted beams of ±n th order to an object; and detecting means for detecting a scattered beam generated on said object by application of said diffracted beams of ±n th order and producing a signal corresponding to a velocity proportional to a frequency of the detected scattered beam, the velocity information of said object being detected according to the said signal;

wherein said beam applying means changes angles of incidence of said diffracted beams of ±n th order to said object in accordance with a change in the wavelength of said beam from said beam source means, so as to substantially compensate for a change in said frequency caused by said change in said wavelength; and wherein said beam applying means further comprises two diffraction gratings for deflecting said diffraction beams of ±n th order from said diffraction grating so that said diffraction beams of ±n th order cross on said object, said two diffraction gratings for deflecting having the same grating pitch as that of said diffraction grating.

9. A velocimeter according to claim 8, wherein said two diffraction gratings for deflection are arranged on both faces of a transparent plate, respectively.

10. A velocimeter comprising:

an emission source for emitting a beam;

directing means including a diffraction grating arranged to be impinged by the beam from said emission source in a direction substantially perpendicular to a direction of arrangement of said diffraction grating and for generating a diffraction beam of +n th order and a diffracted beam of —n th order, the beam impinging on said diffraction grating being collimated and said directing means directing said diffracted beams of ±n th order to an object; and detecting means for detecting a scattered beam generated on said object in response to application of said diffracted beams of ±th order and for producing a signal corresponding to a velocity proportional to a frequency of the detected scattered beam, wherein the velocity information of said object is detected according to said signal;

wherein said directing means changes angles of incidence of said diffracted beams of ±th order to said object in such a manner as to substantially suppress a change in said frequency caused by a fluctuation of the wavelength of said emitted beam; and said directing means further comprises two diffraction gratings for deflecting said diffraction beans of ±n th order from said diffraction grating so that said diffraction beams of ±n th order cross on said object, said two diffraction on gratings for deflecting having the same grating pitch as that of said diffraction grating.

11. A velocimeter according to claim 10, wherein said two diffraction grating for deflection are arranged on both faces of a transparent plate, respectively.

12. A velocimeter comprising:

an emission source for emitting a beam;

a diffraction grating arranged to be impinged by the beam from said emission source in a direction substantially perpendicular to the direction of arrangement of said diffraction grating and for generating a diffracted beam of +n th order and a diffracted beam of —n th order, the beam impinging on said diffraction grating being collimated;

at least one optical element for directing said diffracted beams of ±n th order to an object such that said diffracted beams of ±n th order cross each other on the object; and a detector for detecting a scattered beam generated on said object in response to application of said diffracted beams of ±n th order and for producing a signal corresponding to a velocity proportional to a frequency of the detected scattered beam;

wherein the velocity information of said object is detected according to said signal;

wherein said diffraction grating and said at least one optical element change angles of incidence of said diffracted beams of ±n th order to said object in such a manner as to substantially equalize the crossing angle between said diffracted beams of ±n th order on the object to an angle formed between said diffracted beams of ±n th order when said diffracted beams of ±n th order are emitted from said diffraction grating irrespective of wavelength of said emitted beam; and wherein said at least on optical element consists of two diffraction gratings for reflection having the same grating pitch as that of said diffraction grating and being parallel to said diffraction grating.

13. A laser doppler velocimeter comprising:

beam applying means including beam source means for supplying a laser beam and a reflective diffraction grating arranged to be impinged by the laser beam from said beam source means in a direction substantially perpendicular to the direction of arrangement of said diffraction grating and for generating a diffracted beam of ±n th order and a diffracted beam of −n th order, said beam applying means applying said diffracted beams of ±n th order to an object, the portion on which the laser beam impinges on said diffraction grating and the portion on which said diffracted beams of ±n th order impinge on the object being substantially or almost opposite to each other; and detecting means for detecting a reflective scattered beam generated on said object by application of said diffracted beams of ±n th order and for producing a signal corresponding to a velocity proportional to a frequency of the detected scatter beam;

wherein the velocity information of the object is detected according to said signal;

wherein said beam applying means changes angles of incidence of said diffracted beams of ±n th order to said object in accordance with a change in the wavelength of said laser beam from said beam source means, so as to substantially compensate for a change in said frequency caused by said change in said wavelength.

14. A velocimeter according to claim 13, wherein said beam source means comprises a semiconductor laser.

15. A velocimeter according to claim 13, wherein said beam supplying means further comprises means for deflecting said diffracted beams of ±n th order from said diffraction grating to said object, where a first scattered beam is generated by irradiation of said diffracted beam of +n th order and a second scattered beam is generated by irradiation of said diffracted beam of −n th order, and said detecting means comprises converting means for receiving an interference beam generated by interference of said first and second scattered beams and converting the interference beam into signals.

16. A velocimeter according to claim 15, wherein said means for deflecting comprises two reflecting planes parallel to each other for reflecting said diffraction beams of ±n th order from said diffraction grating so that they cross on said object, both said two reflecting planes intersect perpendicularly to the direction of arrangement of said diffraction grating.

17. A velocimeter according to claim 15, wherein said means for deflecting comprises at least one diffraction grating for deflecting said diffraction beams of ±n th order from said diffraction grating so that said diffraction beams of ±n th order cross on said object.

18. A laser doppler velocimeter comprising;

beam applying means including beam source means for supplying a laser beam and a reflective diffraction grating arranged to be impinged by the beam from said beam source means and for generating a first beam directed in a first direction and a second beam directed in a second direction different from the first direction, said beam applying means applying said first and second beams to an object, the portion on which the beam impinges on said diffraction grating and the portion on which said first and second beams impinge on the object being substantially or almost opposite to each other; and detecting means for detecting a reflective scattered beam generated on said object by application of said first and second beams and for producing a signal corresponding to a velocity proportional a frequency of the detected scattered beam;

wherein the velocity information of said object is detected according to said signal.

19. An apparatus according to claim 18, further comprising a reflection plate for reflecting the beam from said light source means to said diffraction grating by a first reflection surface thereon and for reflecting the reflective scattered light from said object to said detecting means by a second reflection surface arranged reverse to the first surface thereon.

20. A velocimeter comprising;

beam applying means including;
i) beam source means for supplying a beam which is collimated;
ii) a first diffraction grating arranged to be impinged by the beam from said beam source means in a direction substantially perpendicular to the direction of arrangement of said diffraction grating and for generating a diffracted beam of +n th order and a diffracted beam of −n th order;
iii) a second diffraction grating having the same grating pitch as that of said first diffraction grating, arranged to be impinged by said diffracted beams of ±n th order, and for converting said diffracted beams of ±n th order to parallel beams; and
iv) deflecting means for deflecting said diffracted beams of ±n th order so as to cross each other on an object; and detecting means for detecting a reflective scattered beam generated on said object by application of said diffracted means of ±n th order and for producing a signal corresponding to a velocity proportional a frequency of the detected scattered beam;

wherein the velocity information of said object is detected according to said signal; and wherein said beam applying means changes angles of incidence of said diffracted beams of ±n th order to said object in accordance with a change in the wavelength of said beam from said beam source means, so as to substantially compensate for a change in said frequency caused by said change in said wavelength.

21. A velocimeter according to claim 20, wherein said deflecting means comprises a lens having a focal length equal to a length of an interval between said first and second diffraction gratings.

* * * * *

UNITED STATES PATENT AND TRADEMARK OFFICE
CERTIFICATE OF CORRECTION

PATENT NO. : 5,216,478
DATED : June 1, 1993
INVENTOR(S) : HIDEJIRO KADOWAKI ET AL.          Page 1 of 4

It is certified that error appears in the above-identified patent and that said Letters Patent is hereby corrected as shown below:

ON TITTLE PAGE :

ITEM [30] FOREIGN APPLICATION PRIORITY DATA

"Feb. 16, 1990 [JP] Japan ......... 2-30644" should read
--Feb. 9, 1990 [JP] Japan ......... 2-30644--.

AT [56] REFERENCES CITED

Other Publications,
"Leaser-und" should read--"Laser-und--.

COLUMN 1

Line 61, "he" should read --the--.

COLUMN 2

Line 11, "diode, extracted" should read
--diode (extracted--.
Line 14, "mainly" should read --mainly by--.

COLUMN 7

Line 31, "to" should read --to be--.

COLUMN 10

Line 28, "are" should read --is--.

UNITED STATES PATENT AND TRADEMARK OFFICE
CERTIFICATE OF CORRECTION

PATENT NO. : 5,216,478
DATED : June 1, 1993
INVENTOR(S) : HIDEJIRO KADOWAKI ET AL.

It is certified that error appears in the above-identified patent and that said Letters Patent is hereby corrected as shown below:

COLUMN 12

Line 60, "les." should read --less.--.

COLUMN 13

Line 9, "virture" should read --virtue--.
    Line 46, "th" should read --the--.

COLUMN 14

Line 6, "coverts" should read --converts--.
    Line 14, "pathes" should read --paths--.

COLUMN 18

Line 59, "the" (1st occurrence) should read --this--.

COLUMN 20

Line 2, "th" should read --the--.

COLUMN 23

Line 6, "tion 1 gratings" should read --tion gratings--.
    Line 26, "On the" should be deleted.
    Line 27, "other hand." should be deleted.

UNITED STATES PATENT AND TRADEMARK OFFICE
CERTIFICATE OF CORRECTION

PATENT NO. : 5,216,478
DATED : June 1, 1993
INVENTOR(S) : HIDEJIRO KADOWAKI ET AL.       Page 3 of 4

It is certified that error appears in the above-identified patent and that said Letters Patent is hereby corrected as shown below:

COLUMN 26

Line 24, "employs" should read --employ--.

COLUMN 27

Line 2, "thee" should read --the--.

COLUMN 31

Line 38, "light;" should read --lights;--.

COLUMN 32

Line 37, "beans" should read --beams--.
Line 40, "on" should be deleted.
Line 44  "grating" should read --gratings--.

COLUMN 33

Line 8, "on" should read --one--.
Line 19, $\pm$n th order" should read --+n th order--.

UNITED STATES PATENT AND TRADEMARK OFFICE
CERTIFICATE OF CORRECTION

PATENT NO. : 5,216,478
DATED : June 1, 1993
INVENTOR(S) : HIDEJIRO KADOWAKI ET AL.

It is certified that error appears in the above-identified patent and that said Letters Patent is hereby corrected as shown below:

COLUMN 34

Line 19, "proportional a" should read --proportional to a--.
Line 52, "tional" should read --tional to--.

Signed and Sealed this

Thirty-first Day of May, 1994

Attest:

BRUCE LEHMAN

Attesting Officer     Commissioner of Patents and Trademarks